(12) United States Patent
Wang

(10) Patent No.: US 7,965,670 B2
(45) Date of Patent: Jun. 21, 2011

(54) SYSTEM OF FREQUENCY ALLOCATION FOR USER ACCESS LOCAL AREA NETWORK, AND UPLINK AND DOWNLINK TRANSMISSION METHODS THEREOF

(76) Inventor: Yibing Wang, Henan (CN)

( * ) Notice: Subject to any disclaimer, the term of this patent is extended or adjusted under 35 U.S.C. 154(b) by 259 days.

(21) Appl. No.: 12/088,689

(22) PCT Filed: Sep. 28, 2006

(86) PCT No.: PCT/CN2006/002551
§ 371 (c)(1),
(2), (4) Date: Mar. 29, 2008

(87) PCT Pub. No.: WO2007/036154
PCT Pub. Date: Apr. 5, 2007

(65) Prior Publication Data
US 2008/0219292 A1    Sep. 11, 2008

(30) Foreign Application Priority Data

Sep. 29, 2005    (CN) .......................... 2005 1 0105789

(51) Int. Cl.
*H04B 7/00* (2006.01)
(52) U.S. Cl. ......... 370/319; 370/343; 370/392; 370/480
(58) Field of Classification Search .................. 370/319, 370/343–344, 389–392, 430, 480–484
See application file for complete search history.

(56) References Cited

U.S. PATENT DOCUMENTS

2003/0064734 A1 * 4/2003 Stilp et al. .................. 455/456
2005/0083890 A1 * 4/2005 Plotnik et al. .............. 370/334

* cited by examiner

*Primary Examiner* — Ricky Ngo
*Assistant Examiner* — Pao Sinkantarakorn
(74) *Attorney, Agent, or Firm* — NSIP Law

(57) ABSTRACT

A system of frequency allocation for a user access local area network, and uplink and downlink transmission methods thereof are provided. The system of frequency allocation for a user access local area network comprises: an information processing apparatus, a switch, a plurality of first modulators, a broadband high frequency synthesizer, a downlink amplifier, a plurality of trunk splitters, a plurality of branch splitters, a plurality of user terminal digital high frequency demodulators, a plurality of user terminal modulators, a plurality of trunk mixers, a plurality of branch mixers, an uplink amplifier, a broadband high frequency allocator and a plurality of first demodulators. The present invention uses a new communication resource configuration technology with high transparency in which every user is provided with his dedicated communication channel regardless of its busy/idle status. In addition, the present invention adopts a new physical layout construction of the user access LAN with a high frequency broadband, a high speed, and a large capacity in which passive operations without relay amplification can be achieved in the main trunk. Therefore, the seamless communication resource utilization is achieved, and the operation and communication service technology is provided which is suitable to the operation custom of the public so as to be easily learned and propagation.

16 Claims, 10 Drawing Sheets

SYSTEM OF FREQUENCY ALLOCATION FOR USER ACCESS LOCAL AREA NETWORK, AND UPLINK AND DOWNLINK TRANSMISSION METHODS THEREOF

FIELD OF THE INVENTION

The present invention relates to the field of a user access local area network (LAN), more particularly, to a system of frequency allocation of a user access local area network for wired communication of a digital information integration application service, and uplink and downlink transmission methods thereof.

DESCRIPTION OF THE RELATED ART

The users of the existing backbone networks such as broadcasting, telecommunication, the Internet, public information service networks access the LAN through the conventional technology infrastructure in which various networks are established separately, that is, respective communication service application infrastructures are set separately in user terminals, and in which the employed service mode evolves from scientific computations and military applications in the early days. The conventional technology infrastructure has the following disadvantages: operation complexity in user terminals, high technical difficulty, low transparency in the usage of communication resources, large difference in communication quality between busy and idle periods, and unclearness in the division of functions and tasks within the backbone communication networks etc. As a result, presently the various data communication systems can not put into full play their valuable advantageous in the intelligence (high speed logical operations), transmission (communication in high speed with large capacity), storage (high speed massive information access with large capacity) of digitalized information technology, and instead, the various communication service systems have the problems of service standards in disorder, repeated investment, low efficiency in operation, and high costs. Massive wiring is used in the existing user access LANs a, resulting in a big burden on the environment and difficulty in comprehensive distribution and use. Therefore, it is difficult to achieve the transition between generations. These have all contributed to the challenging situation that wired communication faces elimination by the mobile communication as the main communication infrastructure of the current days. The wired communication can not meet the requirements of the highly concentrated user groups, the rapid increase of the information service traffic, increase of demands on the functionality, nor does it meet the demand of the transition between generations, which restricts the progression of the digitalized society.

SUMMARY OF THE INVENTION

The objective of the present invention is to address the above disadvantages in the existing constructions and technology applications, and to provide a network construction and service application communication system for the frequency allocation of a user access LAN with respect to wired data communication of the digital information integration application service. The present invention adopts a new communication resources configuration technology with high transparency in which every user is provided with a dedicated communication channel regardless of a busy/idle status. In addition, the present invention adopts a new physical layout construction of the user access LAN with a high frequency, broad spectrum, high speed, and large capacity for a passive user access LAN which can operate without relay amplification in its main trunk. Therefore, the seamless communication resource usage can be achieved, and the operation and communication service technology is provided which is suitable for the working habits of the mass public and is easy to learn and use. It is possible to support the data communication access of the backbone networks such as broadcasting, telecommunication, the Internet, public information service networks and so on in one network and multi-functional communication within a local network efficiently. The advantages of the present invention can be better utilized in its intelligence (high speed logical operations), transmission (communication with a high speed and large capacity), and storage (mass information access with high speed and large capacity) of the digitalized information technology. Functions and tasks of the backbone network and user access LANs are separated to achieve a highly efficient data communication pattern and to be compatible with the existing TCP/IP technical structure and the analog communication system. The system has advantage as follows: low overall cost; easy to construct and maintain; easy to manage; no need for wiring construction when increasing user capacity; little wiring; adaptability to technology upgrades; industrial mass production of apparatuses for user access LANs; transformation of broadcast and telecom system with low costs. The present invention is suitable for the social situation of high user density and huge information communication. Since it efficiently supports popular application, it is advantageous for the fast development of digitalized society.

In order to achieve the object of the present invention, a system of frequency allocation for a user access Local Area Network is provided, the system comprises: an information processing apparatus which processes an input of backbone network, and generates a downlink integrated digital baseband signal with a plurality of user address codes; a switch which receives the downlink integrated digital baseband signal generated by the information processing apparatus, and generates multiple downlink multiple digital baseband signals with a plurality of user address codes; a plurality of first modulators, each of which works at a different frequency, receives a corresponding one of the multiple downlink multiple digital baseband signals generated by the switch according to a header contained in one of the plurality of user address codes, modulates the received downlink multiple digital baseband signal, and generates one downlink high frequency composite signal with a corresponding frequency; a broadband high frequency synthesizer which synthesizes the plurality of downlink high frequency composite signals generated by the plurality of first modulators, and generates one first downlink high frequency broadband composite signal; a downlink amplifier which amplifies the first downlink high frequency broadband composite signal received from the broadband high frequency synthesizer to a design level, and generates an amplified first downlink high frequency broadband composite signal; a plurality of trunk splitters which perform grading according to the frequency band of a main network segment and perform cascading, receive the amplified first downlink high frequency broadband composite signal from the downlink amplifier according to the main network segment, and split the amplified first downlink high frequency broadband composite signal into second downlink high frequency broadband composite signals of a plurality of main network segments by the frequency, each of which includes a plurality of sub-network segments, wherein the plurality of main network segments correspond to different frequency bands, and the plurality of sub-network segments correspond to different frequency bands; a plurality of branch splitters which correspond to respective trunk splitter groups, and each group of branch splitters of each trunk splitter perform grading according to the frequency band of the plurality of sub-network segments within the range of main network segment and perform cascading, and each of which receives one of the second downlink high frequency broadband composite signals of the one sub-network segment in correspondence with the one sub-network segment among the plurality of sub-network segments, and generates multiple third downlink high frequency broadband composite signals of the one sub-network segment; a plurality of user terminal digital high frequency demodulators each of which receives the multiple third downlink high frequency broadband composite signals in the corresponding sub-network segment from the corresponding one among the plurality of branch splitters, selects one of the multiple third downlink high frequency broadband composite signals in the sub-network segment with the frequency corresponding to the user address code according to the user address code, and demodulates it to a downlink digital baseband signal corresponding to the frequency; a plurality of user terminal modulators each of which receives a corresponding one of the plurality of digital baseband signals with the header of an address code according to a user instruction, and modulates it to an uplink high frequency composite signal corresponding to one of the sub-network segment frequencies of the plurality of user terminal modulators; a plurality of branch mixers which correspond to the group of the main network segments, and perform grading according to the frequency band of the plurality of sub-network segments within the main network segment and perform cascading, and each of which mixes the plurality of uplink high frequency composite signals received from the corresponding user terminal modulator among the plurality of user terminal modulators and the uplink high frequency composite signal received from an adjacent lower branch mixer in the group grade by grade from low frequency to high frequency, and generates a first uplink high frequency broadband composite signal corresponding to each lower sub-network segment covering the lower corresponding frequency; a plurality of trunk mixers which perform grading according to the frequency band of the main network segment and perform cascading, mix the first uplink high frequency broadband composite signal received from an adjacent branch mixer in the branch mixer group corresponding to the main network segment and the uplink high frequency broadband composite signal from the trunk mixer of an adjacent main network segment with a lower frequency band, and generate a second uplink high frequency broadband composite signal corresponding to each lower main network segment covering the lower corresponding frequency; a uplink amplifier which amplifies the second uplink high frequency broadband composite signal received from the adjacent trunk mixer, and generates an amplified uplink integrated high frequency broadband composite signal; a broadband high frequency allocator which receives the amplified uplink integrated high frequency broadband composite signal, and allocates the amplified uplink integrated high frequency broadband composite signal to multiple uplink high frequency broadband composite signals; and a plurality of first demodulators each of which receives one of the multiple uplink high frequency broadband composite signals that corresponds to a user terminal frequency, performs demodulation to generate one digital demodulated baseband signal with a user address code, and provides the digital demodulated baseband signal to the information processing apparatus via the switch, wherein, the information processing apparatus selects the output of the backbone network according to the header of the address code in the received digital demodulated baseband signal, or provides a downlink integrated digital baseband signal with a plurality of headers of the user dual tone multi-Frequency (DTMF) address code to the switch.

According to another aspect of the present invention, a downlink transmission method in a frequency allocated user access Local Area Network, comprising steps of: step 1. processing an input of a backbone network, and generating a downlink integrated digital baseband signal with a plurality of user address codes; step 2. receiving the downlink integrated digital baseband signal generated at step 1, and generating multiple downlink multiple digital baseband signals with a plurality of user address codes; step 3. receiving a corresponding one of the multiple downlink multiple digital baseband signals generated at step 2 according to a header contained in one of the a plurality of user address codes, modulating the received downlink multiple digital baseband signals, and generating one downlink high frequency composite signal with a corresponding frequency; step 4. synthesizing the plurality of downlink high frequency composite signals generated at step 3, and generating one first downlink high frequency broadband composite signal; step 5. amplifying the first downlink high frequency broadband composite signal to a design level, and generating the amplified first downlink high frequency broadband composite signal; step 6. receiving the amplified first downlink high frequency broadband composite signal from the downlink amplifier according to the main network segment, and splitting the amplified first downlink high frequency broadband composite signal into second downlink high frequency broadband composite signals of a plurality of main network segments by the frequency, each of which includes a plurality of sub-network segments, wherein the plurality of main network segments correspond to different frequency bands, and the plurality of sub-network segments correspond to different frequency bands; step 7. receiving one of the second downlink high frequency broadband composite signals of the one sub-network segment in correspondence with the one sub-network segment among the plurality of sub-network segments, and generating multiple third downlink high frequency broadband composite signals of the one sub-network segment; and step 8. receiving the multiple third downlink high frequency broadband composite signals in the corresponding sub-network segment, selecting one of the multiple third downlink high frequency broadband composite signals in the sub-network segment with the frequency corresponding to the user address code according to the user address code, and demodulating it to a downlink digital baseband signal corresponding to the frequency.

According to another aspect of the present invention, an uplink transmission method in a frequency allocated user access Local Area Network, comprising steps of: step 1. receiving a plurality of user instructions from a plurality of user terminal modulators; step 2. receiving a digital baseband signal corresponding to each user instruction in a plurality of digital baseband signals with headers of address codes according to the plurality of user instructions, and modulating them to a plurality of uplink high frequency composite signals corresponding to one of the sub-network segment frequencies of the plurality of user terminal modulators, wherein the plurality of sub-network segments form a plurality of main network segments, the plurality of main network segments correspond to different frequency bands, the plurality of sub-network segments correspond to different frequency bands, and the frequency band of the main network segment covers the frequency band of the sub-network segment contained therein; step 3. mixing the plurality of uplink high frequency composite signals received from the corresponding user terminal modulator among the plurality of user terminal modulators and the uplink high frequency composite signal received from an adjacent lower branch mixer in the group grade by grade from low frequency to high frequency, and generating a first uplink high frequency broadband composite signal corresponding to each lower sub-network segment covering the lower corresponding frequency, by using a plurality of branch mixers which correspond to the group of the main network segments, performs grading according to the frequency band of the plurality of sub-network segments within the main network segment and performs cascading; step 4. mixing the first uplink high frequency broadband composite signal received from an adjacent branch mixer in the branch mixer group corresponding to the main network segment and the uplink high frequency broadband composite signal from the trunk mixer of an adjacent main network segment with a lower frequency band, and generating a second uplink high frequency broadband composite signal corresponding to each lower main network segment covering the lower corresponding frequency, by using a plurality of trunk mixers which perform grading according to the frequency band of the main network segment and perform cascading; step 5. amplifying the second uplink high frequency broadband composite signal received from the trunk mixer with the highest network segment frequency among the plurality of trunk mixers, and generating an amplified uplink integrated high frequency broadband composite signal; step 6. allocating the amplified uplink integrated high frequency broadband composite signal to multiple uplink high frequency broadband composite signals; step 7. receiving one of the multiple uplink high frequency broadband composite signals corresponding to the user terminal frequency respectively by using each of the plurality of demodulators, and performing demodulation to generate multiple digital demodulated baseband signals with user address codes; step 8. receiving the generated multiple digital demodulated baseband signal, and outputting an integrated digital baseband signal with a plurality of headers of user dual tone multi-Frequency (DTMF) address codes according to the header of the address code in the received multiple digital demodulated baseband signals.

The present invention has the following advantages:

1. The existing user access networks of various communications contribute to a big portion of the system cost, and they are all configured separately and incompatible each other, far from meeting the demand of the development of the modern society. The present invention provides a communication service integrating multiple networks into one network in user access networks, realizing the compatibility of analog and digital systems, thereby supporting smooth transitions of between generations of various communications and significant cost reduction.

2. The address code and communication interconnection (protocol) of the present invention are good for backbone network applications in broadcasting and telecommunication for their being transmitted as information in the protocol of the internet. This technology is suitable for the working habits of the mass public, easy to learn and use, and is design and developed for mass propagation and application.

3. The present invention supports various communication protocols, especially digitalized information applications in industries like broadcasting, telecommunication, electronic government business, electronic business, and brings benefits in industry upgrades. Most of the times, only execution programs need be changed in a new upgrade, so that large economic loss due to the wash out of hardware apparatuses caused by system upgrades.

4. The separation of tasks and functionalities between the backbone network and user networks can greatly increase the operation efficiency of the backbone network, reduce the overhead of the useless communication, and promote the expansion of functions in various industries (that is, only core technology is added with little consideration in the investment for renovation of the user access LAN).

5. Only application databases are needed for various services (which can also be interactive) in the society, for accessing the backbone network.

6. The signals Us1-Usn can be directly input to the digital terminal for display, but they also can be A/D converted and input to the existing analog TV applications.

7. The capacity remaining after the allocation of the uplink to the users can be used for the security protection, TV monitoring, user meter reading within the area, so as to take the place of the integration layout completely.

DETAILED DESCRIPTION OF EXEMPLARY EMBODIMENTS OF THE PRESENT INVENTION

Reference will now be made in detail to the present embodiments of the present invention.

Figure 1:
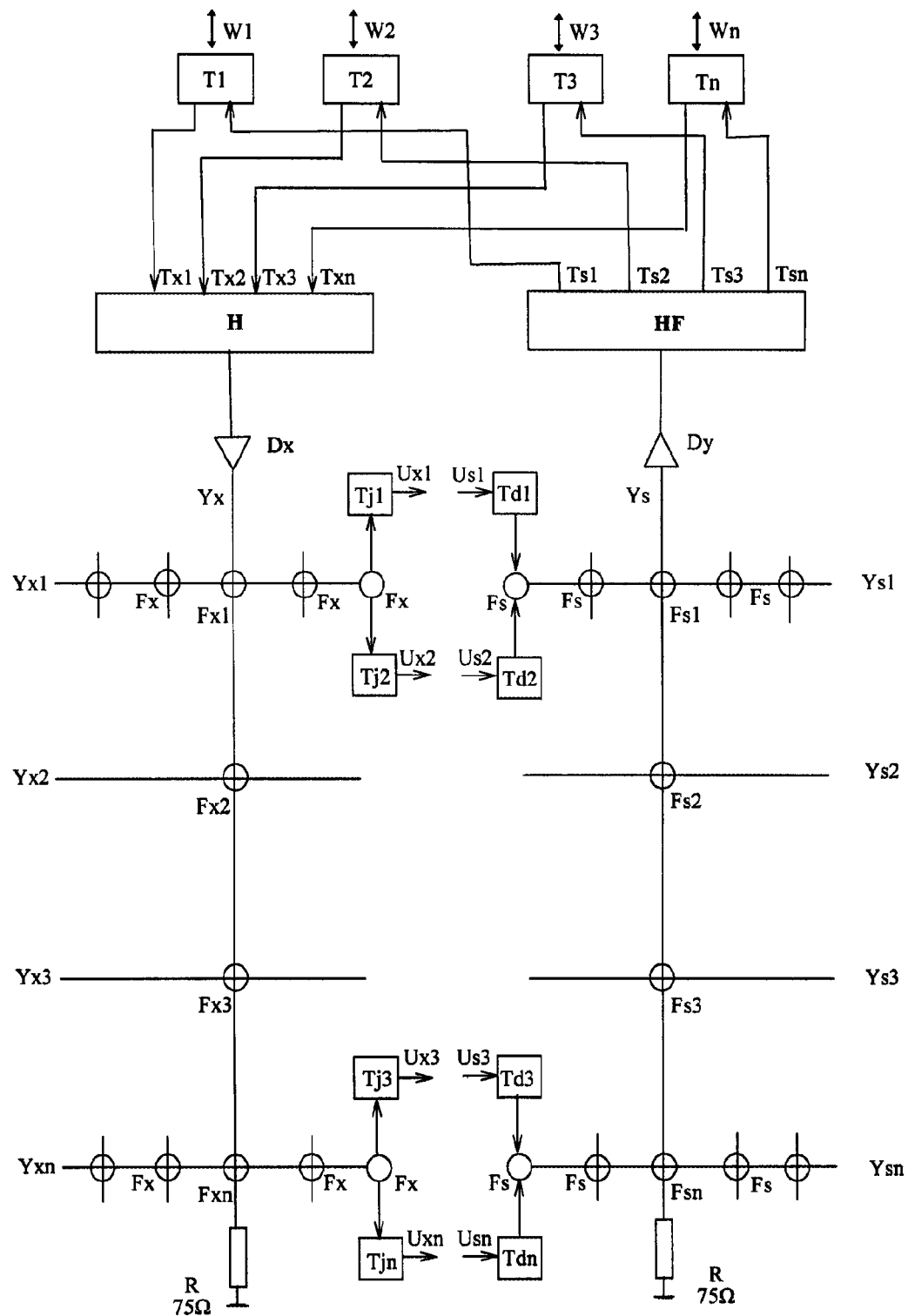
FIG. 1 is a schematic circuit block diagram of frequency allocation for a user access LAN in a digital information integration communication service application according to the embodiment of the present invention.

FIG. 1 is the schematic circuit block diagram of frequency allocation for a user access LAN in the digital information integration communication service application according to the embodiment of the present invention. As shown in FIG. 1, the frequency allocated user access LAN of wired communication in a digital information integration application service comprises: an information processing apparatus (not shown) which may adopt a network server; a network switch (not shown); high frequency digital modems T1, T2, T3 and Tn at the data communication front end; downlink network cable medium Tx1, Tx2, Tx3, Txn; uplink network cable medium Ts1, Ts2, Ts3, Tsn; downlink trunk cable medium Yx in; uplink trunk cable medium Ys; downlink branch cable medium Yx1, Yx2, Yx3, Yxn; uplink branch cable medium Ys1, Ys2, Ys3, Ysn; a high frequency broadband synthesizer H; a high frequency broadband allocator HF; a downlink amplifier Dx which employs cable TV devices and standards; a uplink amplifier Dy which employs cable TV devices and standards; a plurality of downlink trunk splitters Fx1, Fx2, Fx3, Fxn; a plurality of downlink branch splitters Fx; a plurality of uplink trunk mixers Fs1, Fs2, Fs3, Fsn; a plurality of uplink branch mixers Fs; high frequency digital demodulators Tj1, Tj2, Tj3, Tjn at the user terminals; high frequency digital modulators Td1, Td2, Td3, Tdn at the user terminals, different types of high frequency digital modulators and demodulators being selected for possessing different frequency bands and providing services at different communication rates; and the matched resistor R at the link terminal which generally adopts a 75Ω ground resistor.

In order to avoid cross talk, band pass filters can be added at the output end of the each downlink splitter and the input end of the each uplink mixer. The central frequency corresponds to the allocated frequency, that is, in the spectrum range within the cut-off frequency of the network cable medium.

In FIG. 1, W1, W2, W3, Wn are digital bidirectional baseband signals for both the uplink and downlink; Ux1, Ux2, Ux3, Ux4 are downlink digital baseband signals at the user terminal; and Us1, Us2, Us3, Us4 are uplink digital baseband signals at the user terminal. According to an embodiment of the present invention, in order to improve information capacity, these network cable medium Tx1-Txn, Ts1-Tsn, Yx, Ys, Yx1-Yxn, Ys1-Ysn can use high frequency coaxial-cables, such as a series of products including SYKV-75-, SYWV-75- in China, TFC-T10-500, Trilgymc^2 0.44-1.0 in U.S., NOKIA-Sm3 in Finland and so on.

As shown in FIG. 1, a front end server is set in the user access network, so as to connect to the network switch and backbone networks (such as broadcasting, telecommunication, the Internet and public information service) through LAN trunk ports. The user port of the server LAN connects to the network switch, and the user port of the network switch connects to the high frequency digital modems T1-Tn through a twisted pair cable, so as to transmit the digital baseband signals W1-Wn. The user port of the network switch is set to a fixed default user recognized status (not for PC user), and the external storage of the front end server is divided into: 1. an operation area, mainly for serving the operation system and operation application software; 2. a public information storage area, mainly for sharing information service among the users within the area; 3. a management area, mainly for managing information service within an area; 4. a dedicated user area, as the maximum application area of an external storage, which sets the storage area to various dedicated user file areas with different capacities according to the number of the users and user application levels, and every user sets a different 8-bit dual tone code name as the dedicated communication address code of the respective user, which the server grants the user.

The downlink information with a header of the 8-bit DTMF dual tone code address processed by the server couples to the network switch trunk port via the LAN port and the user port of the network switch, so as to form the downlink signals in the digital bidirectional baseband signals W1-Wn for the uplink and downlink. The W1-Wn couple to the downlink input port of the high frequency digital modems T1-Tn respectively via twisted pair cables. The high frequency digital modems T1-Tn each operate under designated dedicated central frequencies and frequency bandwidths, operations of which are controlled by the respective trigger circuits for unique 8-bit dual tone codes in a dedicated area. Only when there is a signal with a dual tone code header of the corresponding digital information, do the trigger circuits power on and work. The trigger circuits power off and stop working if triggered by a tail dual tone trigger signal after the information transmission is completed, thereby ensuring that every granted user exclusively owns the downlink channel of one or more dedicated frequencies. The downlink baseband digital signal is modulated to multiple high frequency composite signals with different frequencies by the high frequency digital modems T1-Tn, and the multiple high frequency composite signals are input to the input port of the high frequency broadband synthesizer H via the network cables Tx1-Txn so as to become one high frequency broadband composite signal, which is input to the input port of the downlink amplifier Dx via the output port with high frequency coaxial-cables. The high frequency broadband composite signal with a predetermined field strength after being amplified, couples to the downlink trunk Yx via the output port, and to the splitters Fx1-Fxn in the trunk Yx, and is then divided into respective downlink branches Yx1-Yxn for the designated dedicated frequency bands. Among them, the branches near the downlink amplifier Dx operate at high frequency bands, and the central frequencies of the user demodulators which the branches support are all granted allocation within the high frequency bands, while the branches at the far end in turn operate at intermediate and low frequency bands. The downlink high frequency broadband composite signal couples to the input ports of the user high frequency digital demodulators Tj1-Tjn via the splitter Fx with high frequency coaxial-cables. The functional configuration and operating central frequency of the high frequency digital demodulators Tj1-Tjn for each user should be set to correspond with those of the high frequency digital modems T1-Tn. The high frequency composite signal with the dedicated frequency that the user has specified is selected by the frequency selection of the high frequency digital demodulators Tj1-Tjn, and the respective digital baseband signals Ux1-Uxn are output from the output ports after the demodulation process, so as to form the downlink data communication from the server to respective users.

The uplink digital baseband signals Us1-Usn with the private 8-bit dual tone code headers of respective users are respectively coupled to the input ports of the users' high frequency digital modulators Td1-Tdn, and are modulated to multiple high frequency composite signals with different frequencies. The multiple high frequency composite signals are mixed into the uplink branches Ys1-Ysn by the mixer Fs, and through a mixing process of the mixers Fs1-Fsn, form an uplink high frequency broadband composite signal. The uplink high frequency broadband composite signal couples to the input port of the uplink amplifier Dx via the uplink trunk Ys. The frequency ranges of the uplink trunks Ys and uplink branches Ys1-Ysn are set under the same principle as for the downlink trunk, while their transmission directions are opposite to that of the downlink trunk. The operating central frequency and functional configuration of the high frequency digital modulators Td1-Tdn are set to be equivalent and correspond with the demodulation frequency of the high frequency digital modems T1-Tn. The high frequency composite signal is amplified by the uplink amplifier Dx to a predetermined signal field strength and coupled to the input port of the high frequency broadband allocator HF via the output port with a high frequency coaxial-cable. The multiple high frequency composite signal output from the output port of the high frequency broadband allocator HF couples to the input port of the uplink digital demodulators of the high frequency digital modems T1-Tn via the network cables Ts1-Tsn, and the uplink digital baseband signal with the 8-bit dual tone code header in the digital bidirectional baseband signals W1-Wn for both the uplink and downlink are frequency selected and demodulated. The respective user ports of the network switch are connected with each other via twisted pair cables, and connected to the LAN port of the server via the trunk port of the network switch to submit the information for the server to process, so as to form the uplink data communication transmission within the user access LAN.

The server connects to backbone networks such as the broadcasting, telecommunication, the Internet and public information service networks respectively via a backbone network interface, so that all the users within the user access LAN share a group of the relay communication services of the telecommunication backbone network, share one internet domain name service, and share the intellectual (high speed logical operation) services such as routing, switching, digital signal processing of the server. The various shared information needed by the users within the present network are downloaded to a public information area from various upper level databases (to be claimed in a separate application), and network web sites are downloaded to the public information area via the trunk packets with a high speed and a large capacity, for users' use and selection within the network; subscription or instant information that the users within the network have booked on demand is downloaded from various upper level databases at a high rate to user private file storage areas for a user's instant use or use at any moment. The server selects the backbone network link required for communication with external networks according to the user request for the external communication, and handle the file packets transmission in an intensive manner for adapting to the high speed transmission in various backbone networks, or multi-user integrate download of the same information (in which multiple address headers are added to one file), according to the information type, so that the server undertakes the task of separating the functionalities of the backbone network and the user access LAN and the backbone network is mainly responsible for long distance transmission of the intensive communication at a high speed. Therefore, the backbone network is not constrained by the users and the operation efficiency is increased. When a terminal user sends out a request instruction with its 8-bit DTMF dual tone code, the server immediately sends down to the user an application service interface or a classification information menu with decimal signs. The user can click or send out a decimal sign so as to request a service from the server. The server sets the information that the user requests to be sent within or outside the network to carry a header of a 8-bit DTMF dual tone address code of the corresponding user, to facilitate routing and switching in various backbone networks and easy recognition by the front end switch or server of the called user access LAN (including the existing analogy network). The various information required to be delivered to the user in the downlink are all added with the header of the 8-bit dual tone address code of this user, so that the respective user can receive the required downlink digital baseband signals Ux1-Uxn. A service classification identification code is added into the header code, of the various kinds of uplink or downlink information with different functions for separately processing the functional classification received by the front end server and the terminal. Among the service classification identification codes, AXX indicates broadcasting: A01 is for movies and TV, A02 for a music language (single audio), . . . ; BXX indicates telecommunication: B01 is for language speech, B02 for video speech, . . . ; ABXX indicates electronic government business, . . . ; C110 indicates a public emergency alarm direction, C119 indicates a fire alarm, C121 indicates a weather disaster alarm, C120 indicates a traffic emergency and so on. A corresponding control circuit is provided in the audio circuit of the user terminal, and the control circuit can automatically power the master on from its power-off state when the information described above arrives, and can automatically switch to the emergency state from a normal use state, can automatically keep a proper volume to secure an emergency alarm effect, and can automatically shut off or switch to a normal use state after the completion of the alarm. DXX is the code special for a shut-off tail trigger. For example, D01 indicates a shut-off of T1-Tn, DC is for a shut-off of the terminal, and D9XX is for a shut-off of the terminal home appliances. The long-distance control port of the home appliances is provided in the terminal, so that the user can control the operation of the home appliances at home by using his telephone or cell phone. When the user gets through the terminal at home, he/she presses B91 for the air conditioner, B92 for the microwave oven, B93 for the electric rice cooker, B94 for the lamp and B95 for the security alarm system. The PC users within the network use TCP/IP communication protocol, still enjoying support from the server.

Analog modems can be used in the network according to the present invention to be compatible with analog communication. For example, the telephone communication with wired telephone networking as disclosed in the patents Nos. 03128252.0 and 03254677.7 and the cable broadcasting disclosed in the patents Nos. 00259541.1 and 02290681.9, all of which were filed by the applicant, may be used, for the compatible operation of digital and analog communication so as to support the stable transition in broadcasting or telecommunication.

As shown in FIG. 1, in the frequency allocation of the user access local area network system for digital information comprehensive communication service applications according to an embodiment of the present invention, an information processing apparatus (not shown) processes input from the community backbone network and generates a downlink integrated digital baseband signal with a plurality of user address codes. A switch (not shown) receives the downlink integrated digital baseband signal generated by the information processing apparatus and generates multiple downlink multiple digital baseband signals W1-Wn with the plurality of user address codes. Each modulator of a plurality of high frequency digital modems T1-Tn, each of which operates at a different frequency, receives a corresponding one of the multiple downlink digital baseband signals W1-Wn generated by the switch according to the header contained in one of the plurality of user address codes, modulates the received downlink multiple digital baseband signals, and generates a downlink high frequency compound signal of a corresponding frequency. A plurality of downlink high frequency compound signals generated by each modulator are represented as Tx1-Txn. A high frequency broadband synthesizer H synthesizes the plurality of downlink high frequency composite signals Tx1-Txn generated by the plurality of modulators and generates a downlink high frequency broadband composite signal. A downlink amplifier Dx amplifies the downlink high frequency broadband composite signal received from the high frequency broadband synthesizer H to a design level so as to generate an amplified downlink high frequency broadband composite signal. A plurality of trunk splitters Fx1-Fxn are graded and cascade connected according to the frequency band of the main network segment, and are used to receive the amplified downlink high frequency broadband composite signal from the downlink amplifier Dx according to the main network segment, and to split the amplified downlink high frequency broadband composite signal, according to the frequency, into downlink high frequency broadband composite signals of a plurality of the main network segments. Herein, the frequencies corresponding to the plurality of the main network segments are different from each other, and the frequencies corresponding to a plurality of secondary network segments are different from each other, wherein each of the plurality of the main network segments includes a plurality of corresponding secondary network segments. A plurality of branch splitters Fx are grouped correspondingly to each trunk splitter, and each group of the branch splitters corresponding each trunk splitter are graded and cascade connected according to the frequencies of the plurality of secondary network segments within the range of the main network segment. Each branch splitter is used to receive one of the downlink high frequency broadband composite signals of a secondary network segment corresponding to one of the plurality of the secondary network segments, and generates multiple third downlink high frequency broadband composite signals of the secondary network segment. The frequency allocation user access local network system of the present invention allows multiple users to operate simultaneously, and each user corresponds to a user terminal digital high frequency demodulator. One of a plurality of the user terminal digital high frequency demodulators Tj1-Tjn receives the multiple downlink high frequency broadband composite signals in a corresponding secondary network segment from the corresponding one of the plurality of branch splitters Fx, selects one of the multiple downlink high frequency broadband composite signals having a frequency corresponding to the user address code in the secondary network segment according to the user address code, and demodulates the downlink high frequency broadband composite signal into a downlink digital baseband signal corresponding the frequency. Described above is the downlink portion of the frequency allocation user access local network system of the present invention.

During the uplink processing, each of a plurality of user terminal modulators Td1-Tdn corresponding to respective users receives a corresponding one of a plurality of digital baseband signals with the address code header according to a user instruction, and modulates the digital baseband signal into a uplink high frequency composite signal corresponding to one of the frequencies of the secondary network segments of the plurality of user terminal modulators. A plurality of branch mixers Fs correspond to the group of the main network segments, and are graded and cascade connected according to the frequency bands of the plurality of secondary network segments within the range of the main network segment. Each branch mixer is used to mix, from low frequency to high frequency grade by grade, a plurality of uplink high frequency composite signals received from the corresponding user terminal modulator among the plurality of user terminal modulators Td1-Tdn and the uplink high frequency composite signal received from an adjacent lower branch mixer Fs in the corresponding group, and generates an uplink high frequency broadband composite signal corresponding to respective lower secondary network segments covering the corresponding lower frequencies. A plurality of trunk mixers Fs1-Fsn which are graded and cascade connected according to the frequency bands of the main network segment mix the uplink high frequency broadband composite signal received from the adjacent branch mixer among a group of the branch mixers corresponding to the main network segment and the uplink high frequency broadband composite signal having a lower frequency band from the trunk mixer of the adjacent main network segment, and generate uplink high frequency broadband composite signals corresponding to the respective lower main network segments covering the corresponding lower frequency bands. Then, the uplink amplifier Dy amplifies the uplink high frequency broadband composite signal received from an adjacent trunk mixer Fs1, and generate an amplified uplink integrated high frequency broadband composite signal. Next, a broadband high frequency allocator HF receives the amplified uplink integrated high frequency broadband composite signal, and allocates the amplified uplink integrated high frequency broadband composite signal to multiple uplink high frequency broadband composite signals Ts1-Tsn. Each of the demodulators of the plurality of high frequency digital modems T1-Tn receives one of the multiple uplink high frequency broadband composite signals Ts1-Tsn which corresponds to a frequency of the user terminal, performs demodulation to generate a digital demodulated baseband signal corresponding to the user address code, and provides the generated digital demodulated baseband signal to the information processing apparatus via the switch. The information processing apparatus selects the community backbone network output or provides the downlink integrated digital baseband signal with a plurality of headers of the user dual tone address code to the switch according to the header with the address code in the received digital demodulated baseband signal.

Figure 2:
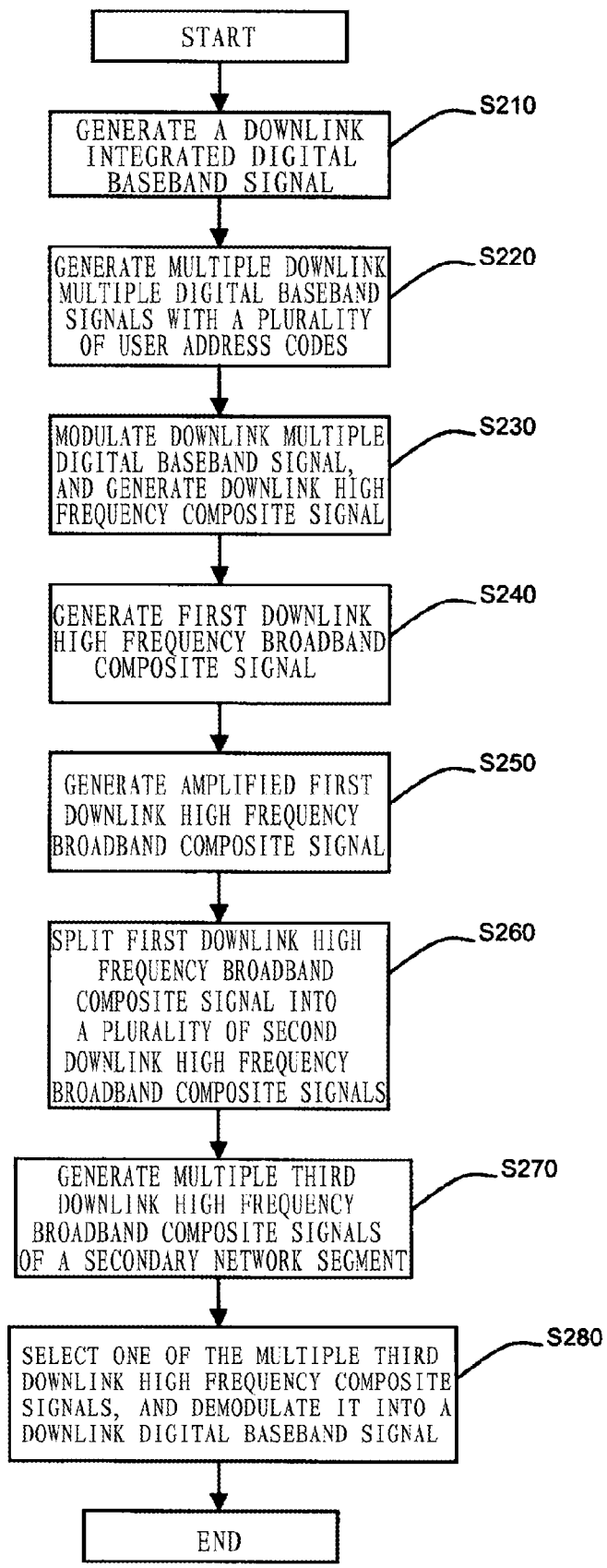
FIG. 2 is a flowchart of a downlink operation in frequency allocation of a user access LAN according to the present invention.

The uplink and downlink operations of the frequency allocation user access local network system will be described below in connection with the accompanying drawings. FIG. 2 is a flowchart of a downlink operation of the frequency allocation user access local network system according to the present invention. In step S210, the information processing apparatus processes input from the community backbone network and generates a downlink integrated digital baseband signal with a plurality of user address codes. In step S220, the switch receives the downlink integrated digital baseband signal with the plurality of user address codes from the information processing apparatus, and hereby generates multiple downlink multiple digital baseband signals W1-Wn with the plurality of user address codes. In step S230, each of modulators of the high frequency digital modems T1-Tn, each of which operates at the different frequency respectively, receives a corresponding one of multiple downlink multiple digital baseband signals W1-Wn from the switch according to the header contained in one of the plurality of user address codes, modulates the received downlink multiple digital baseband signals, and generates a downlink high frequency composite signal at a corresponding frequency. A plurality of downlink high frequency composite signals generated by respective modulators are represented as Tx1-Txn. Next, in step S240, the high frequency broadband synthesizer H synthesizes the plurality of downlink high frequency composite signals Tx1-Txn generated by the plurality of modulators and generates a first downlink high frequency broadband composite signal. In step S250, the downlink amplifier Dx amplifies the first downlink high frequency broadband composite signal to a design level so as to generate an amplified first downlink high frequency broadband composite signal. In step S260, a plurality of trunk splitters Fx1-Fxn receives the amplified first downlink high frequency broadband composite signal according to the main network segment, and splits the amplified first downlink high frequency broadband composite signal into second downlink high frequency broadband composite signals of a plurality of the main network segments, wherein each of the plurality of the main network segments includes a plurality of corresponding secondary network segments, the frequencies corresponding to the plurality of the main network segments are different from each other, and the frequencies corresponding to the plurality of secondary network segments are different from each other. In step S270, each of the plurality of trunk splitters Fx1-Fxn receives one of the second downlink high frequency broadband composite signals of a secondary network segment corresponding to one of the plurality of the secondary network segments, and generates multiple third downlink high frequency broadband composite signals of the secondary network segment. Finally, in step S280, the respective user terminal digital high frequency demodulators Tj1-Tjn receive the multiple third downlink high frequency composite signals in a corresponding secondary network segment, selects one of the multiple third downlink high frequency composite signals having a frequency corresponding to the user address code in the secondary network segment according to the user address code, and demodulates selected third downlink high frequency composite signal into a downlink digital baseband signal corresponding to the frequency. Accordingly, the downlink operation of the frequency allocation user access local network system according to the present invention is completed.

Figure 3:
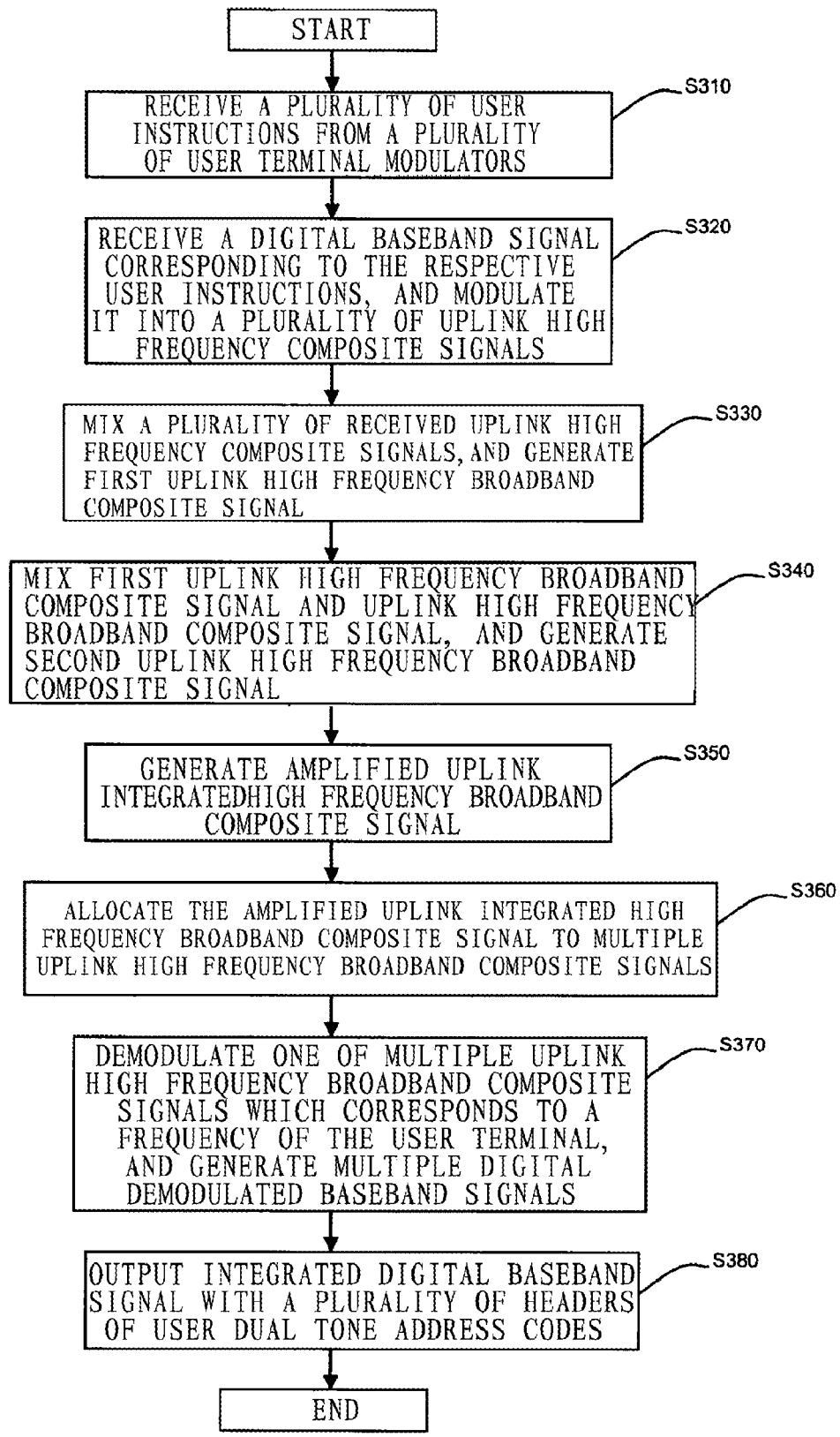
FIG. 3 is a flowchart of an uplink operation in frequency allocation of a user access LAN according to the present invention.

FIG. 3 is a flowchart of an uplink operation of the frequency allocation user access local network system according to the present invention. As shown in FIG. 3, in step S310, a plurality of user terminal modulators Td1-Tdn receive a plurality of user instructions. In step S320, each of the plurality of user terminal modulators Td1-Tdn receives a digital baseband signal corresponding to the respective user instructions among a plurality of digital baseband signals with the address code header, and modulates the digital baseband signals into a plurality of uplink high frequency composite signals corresponding to the frequencies of the secondary network segments of the plurality of user terminal modulators, wherein the plurality of secondary network segments constitute a plurality of main network segments, the frequencies corresponding to the plurality of the main network segments are different from each other, the frequencies corresponding to the plurality of secondary network segments are different from each other, and the frequency band of each main network segment covers the frequency bands of the secondary network segments contained in the main network segment. Next, in step S330, a plurality of branch mixers Fs, which correspond to the group of the main network segments and are graded and cascade connected according to the frequencies of the plurality of secondary network segments within the range of the main network segment, mix a plurality of uplink high frequency composite signals received from the corresponding user terminal modulator among the plurality of user terminal modulators and the uplink high frequency composite signal received from an adjacent lower branch mixer in the group from low frequency to high frequency grade by grade, and generates an uplink high frequency broadband composite signal corresponding to the respective lower secondary network segments covering the corresponding lower frequencies. In step S340, a plurality of trunk mixers Fs1-Fsn, which are graded and cascade connected according to the frequencies of the main network segment, mix the first uplink high frequency broadband composite signal received from an adjacent branch mixer in a group of the branch mixers corresponding to the main network segment and the uplink high frequency broadband composite signal from the trunk mixer of the adjacent main network segment having a lower frequency, and generate uplink high frequency broadband composite signals corresponding to the respective lower main network segments covering the corresponding lower frequencies. Then, in step S350, an uplink amplifier Dy amplifies the uplink high frequency broadband composite signal received from a trunk mixer having the highest frequency among the plurality of trunk mixers Fs1-Fsn, and generates an amplified uplink integrated high frequency broadband composite signal. Next, in step S360, a broadband high frequency allocator HF allocates the amplified uplink integrated high frequency broadband composite signal to multiple uplink high frequency broadband composite signals Ts1-Tsn. In step S370, each of demodulators of the plurality of high frequency digital modems T1-Tn respectively receives one of the multiple uplink high frequency broadband composite signals which corresponds to a frequency of the user terminal, and performs demodulation to generate multiple digital demodulated baseband signals corresponding to the user address code. Finally, in step S380, the generated multiple digital demodulated baseband signals are received, and an integrated digital baseband signal with a plurality of headers of the user dual tone address code are output according to the header of the address code in the received multiple digital demodulated baseband signals. The integrated digital baseband signal with a plurality of headers of the user dual tone address code is provided to the information processing apparatus via the switch. Based on the user instruction, the information processing apparatus selects the community backbone network for output or provides the downlink integrated digital baseband signal with a plurality of headers of the user dual tone address code to the switch according to the header of the address code in the received digital demodulated baseband signal.

Figure 4A:
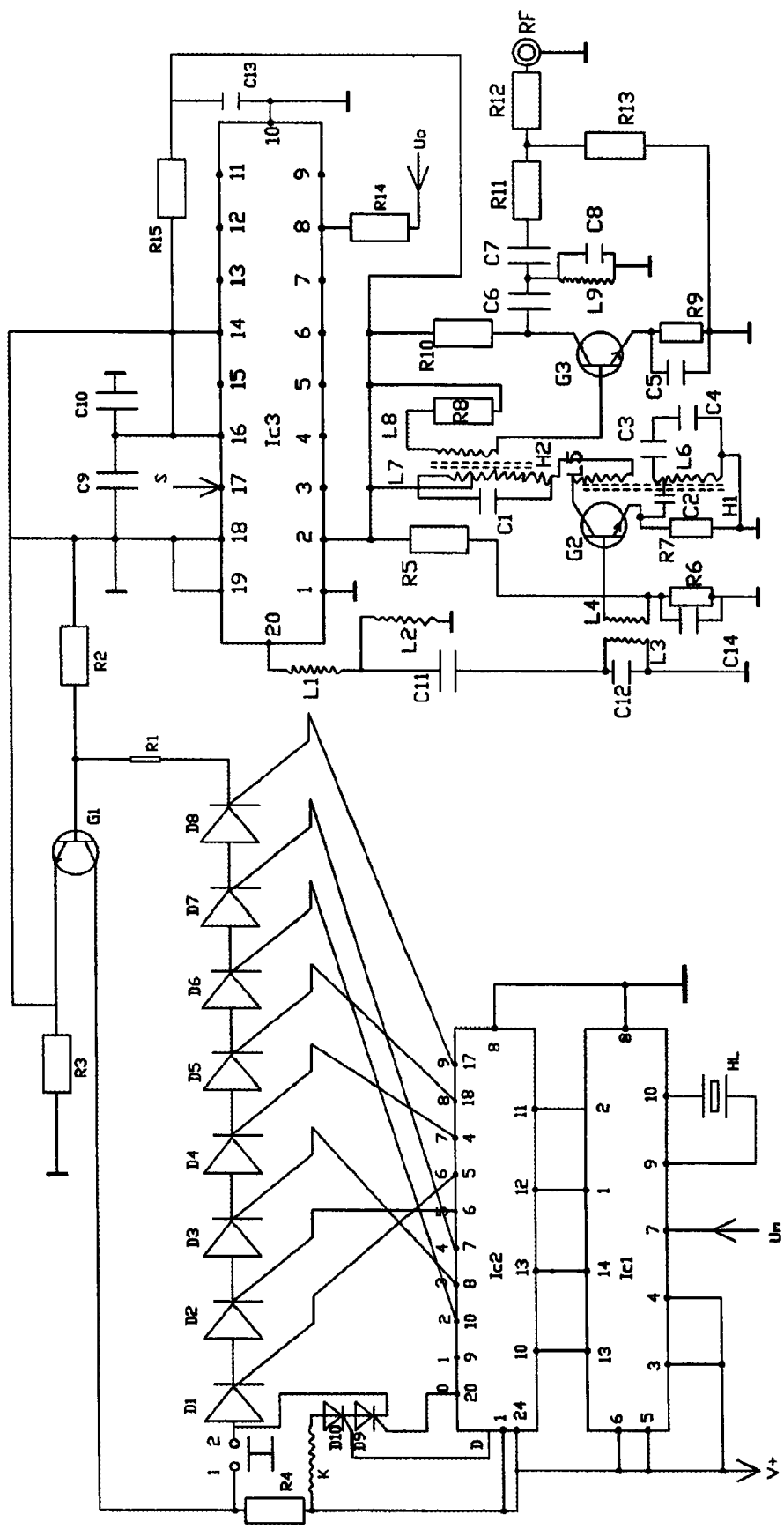
FIG. 4A is a schematic circuit diagram of a high frequency digital modulator according to an embodiment of the present invention.
Figure 4B:
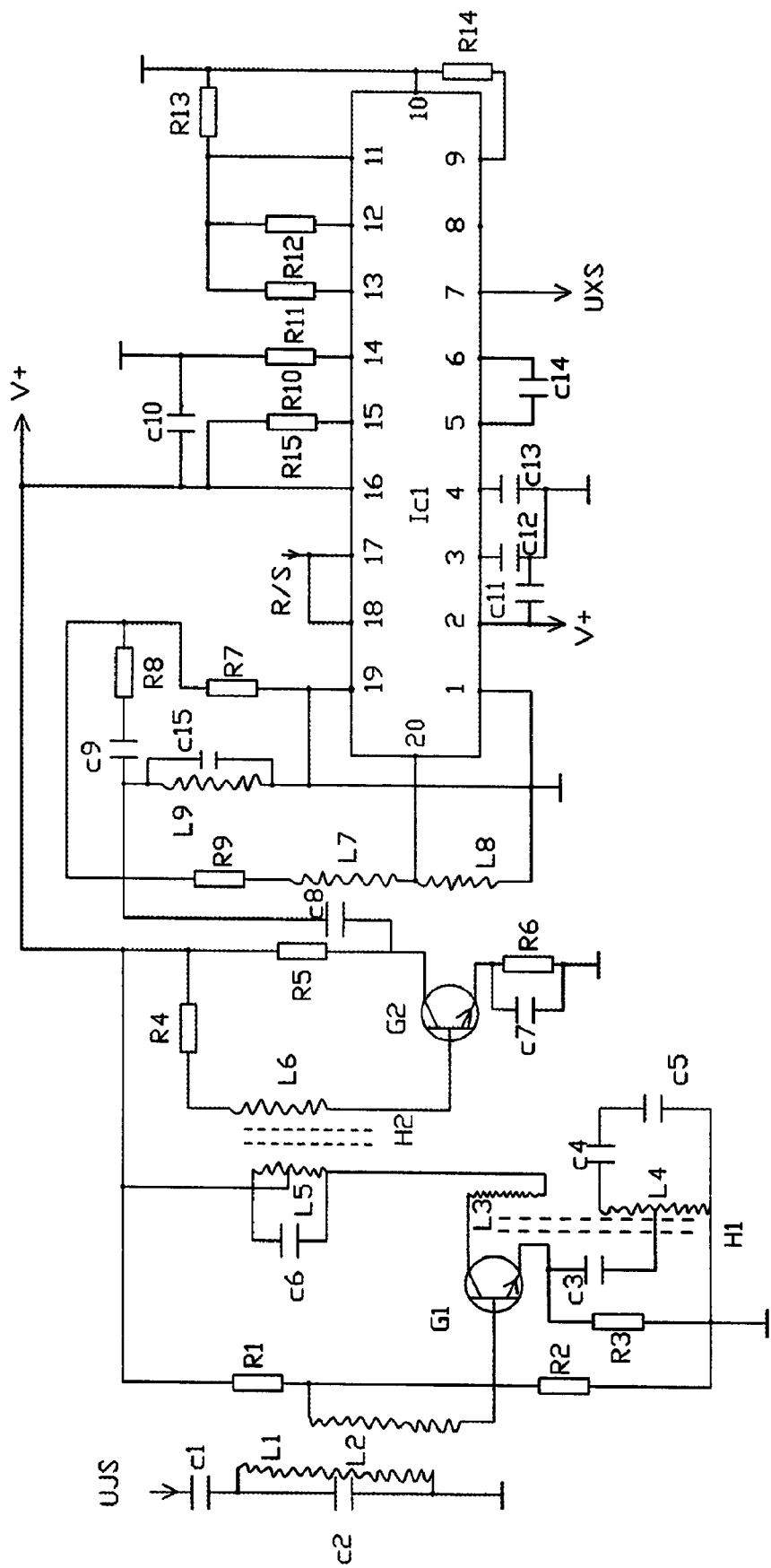
FIG. 4B is a schematic circuit diagram of a high frequency digital demodulator according to an embodiment of the present invention.
Figure 4C:
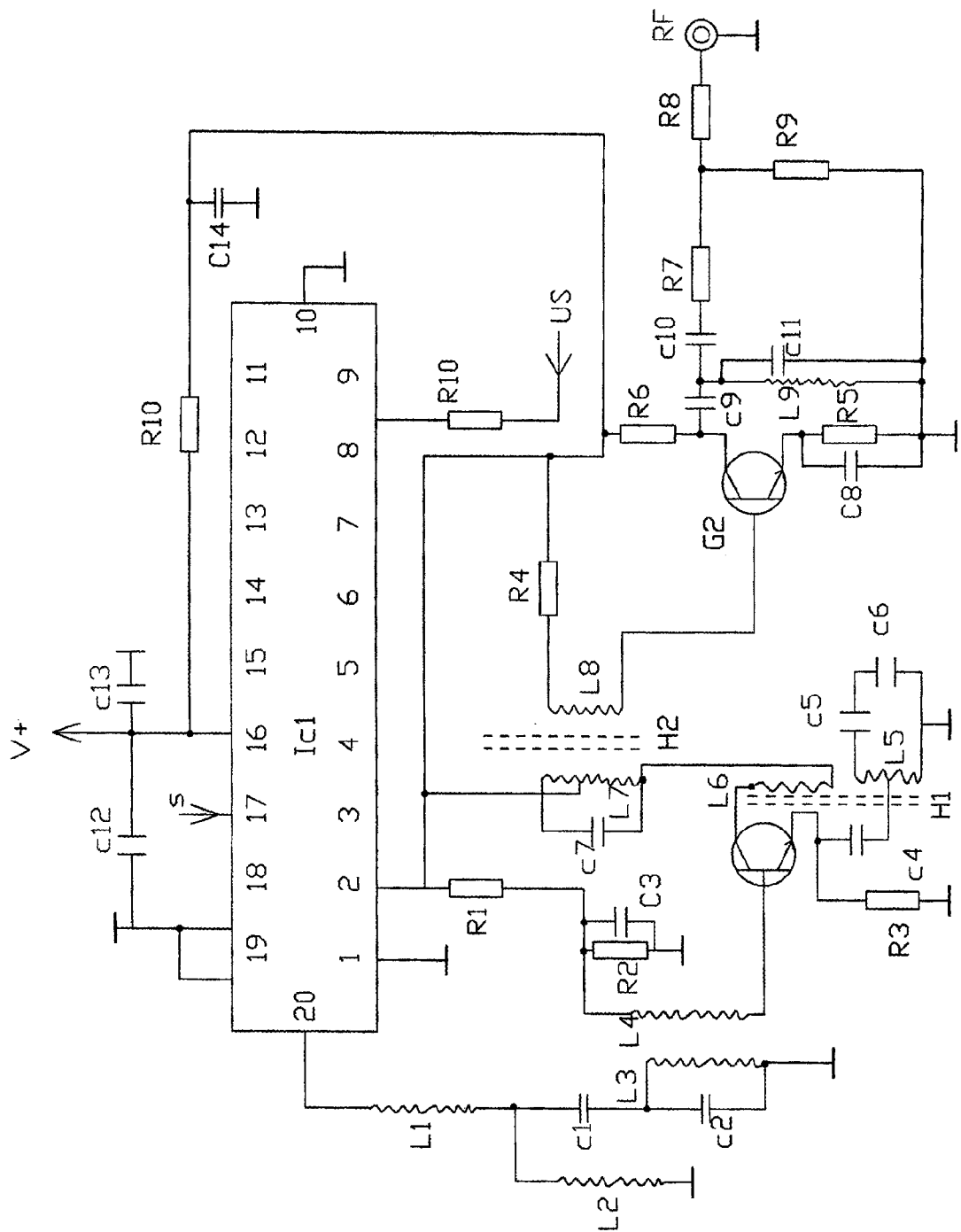
FIG. 4C is a schematic circuit diagram of a user terminal modulator according to an embodiment of the present invention.

FIGS. 4A-4C are schematic circuit diagrams of the digital high frequency modulator and demodulator according to the present invention. FIG. 4A is a circuit schematic diagram of the digital high frequency modulator. In the digital high frequency modulator, IC1 is an application specific integrated circuit for DTMF decoding, and a YN9101, in which circuits for logical processing, sine wave generating and clock oscillating are provided, is used in this embodiment. Pin 9 and pin 10 of the IC1 connect to a crystal oscillator HL so as to ensure clock synchronization. IC2 is an application specific integrated circuit for DTMF transcoding, and a CD4028, in which a logical processing circuit is provided to transcoding a binary DTMF signal into a decimal code, is used in this embodiment. D1, D2, D3, D4, D5, D6, D7, D8, D9 and D10 are unidirectional thyristors. D1 through D8 form a power-on address code combining circuit, and D9 and D10 form a power-off code circuit. The power-on address code combining circuit and the power-off code circuit constitute a dual tone code switch circuit in the present invention. G1 is a transistor. Resistors R1 and R2 form G1's base bias circuit, R3 is G1's emitter resistor, and R4 is used as G1's collector load resistor and current-limiting protective resistor. K is a normal close relay. Control terminals of D1 through D8 connect respectively to decimal pins 6, 5, 3, 7, 8, 2, 4 and 9 of the application specific integrated circuit IC2 for dual tone transcoding, so as to form an address code of 65378249. D10 and D9 connect to pin D and pin 0 respectively, form a power-off circuit with K, and together with the application specific integrated circuit IC1 for dual tone decoding, the application specific integrated circuit IC2, GI and peripheral elements, form a dedicated power-on/off coding trigger circuit. When the digital signals W1-Wn from the switch contain the DTMF signal coded as 65378249, the digital signal is converted into a dual tone signal through a digital analog converting circuit (PCM), and input into pin 7 of the application specific integrated circuit IC1 for dual tone decoding.

The two groups of digital binary dual tone signals output from pins 1, 2, 3 and 4 of IC1 are input into the corresponding pins 12, 11, 10 and 13 of IC2, and transcoded and output as decimal numbers 0, 1, 2, 3, 4, 5, 6, 7, 8, 9 and 10, and characters #, *, A, B, C and D via the application specific integrated circuit IC2 for dual tone transcoding. If the output is 65378249, D1 to D8 are triggered sequentially to be turned on. The base bias voltage is provided to G1 via R1 and R2, so that G1 gets turned on and supplies power to the back end circuit from its emitter (If the power is not cut off after D1 to D8 are turned on, D1 to D8 are always on and operated reliably). When information transmission is completed, D9 and D10 are triggered to be turned on upon the arrival of signals D and 0 in the tail. At this time, a current flows through the working coil of K which then acts, so that the contact of A and B is open, and then all of thyristors D1 to D10 are in an off state because the power is cut off, and G1 loses the base bias voltage, thereby being turned off. The emitter of G1 which has lost power can not output to the back end circuit. At this time, K loses power, so that the contact of 1 and 2 closes again and the trigger circuit is in the standby state.

IC3 is a digital high frequency modulation integrated circuit, and a Tx6000, in which an SAW resonator, an SAW filter, an RF amplifier, a modulation circuit and a bias control circuit are provided, is used in this embodiment. Pin 17 functions as a state control. When a signal input into pin 17 is at a high level, IC3 operates in an emission state, and when the signal is at a low level, IC3 is in a standby state. L1 is a serial matching coil, L2 is a protective coil, C11 is a coupling capacitor, and coils L3 and C12 form a frequency selection resonance circuit in which the receiving frequency can vary as the capacitance and inductance vary. C2 is a high frequency transistor, resistors R5 and R6 are base bias resistors of G2, and R7 is an emitter resistor of G2. Inductors L7, L6 and L5, capacitors C1, C2, C3 and C4, and high frequency magnetic cores H1 and H2, and G2 form a frequency conversion amplifying circuit together. G3 is a high frequency amplifying transistor, resistor R8 is a base bias resistor, R9 is an emitter resistor, R10 is a collector load resistor, capacitors C6, C7, C8, C9 and inductor L9 form a filter circuit, C8 functions as a coupling capacitor simultaneously, resistors R1, R12 and R13 form an impedance matching circuit, and RF functions as a high frequency output port. C14 and C5 are bypass capacitors, C9, C10 and C13 are filter capacitors, R15 is a filter resistor, and R14 is a damping resistor. The downlink digital signal with a user address code among W1-Wn makes the digital modulation high frequency circuit having a dedicated frequency exclusively for the user to switch on and operate. The signal is input into pin 7 of IC3 via R14, converted into a high frequency composite signal and output via pin 20 after it is processed by the internal circuit, passes L1 and C11, then tuned to selected frequency via C12 and L3, and coupled to the base of G2 via L4. After the signal is converted to a user authorized frequency through a frequency conversion circuit formed by G2 and peripheral elements, it is coupled to the base of G3 via L7 and L8 and output to Tx1-Txn via C6, C7, R11, R12 and RF after it is amplified by G3.

FIG. 4B is a circuit schematic diagram of the digital high frequency demodulator. In the digital high frequency demodulator, G1 is a high frequency and frequency conversion transistor, H1 and H2 are high frequency magnetic cores, G1, H1, H2, inductors L3, L4 and L5, and capacitors C3, C4, C5 and C6 form a frequency conversion amplifying circuit all together, resistors R1 and R2 are the base bias resistors of G1, R3 is an emitter resistor, G2 is a high frequency amplifying transistor, R4 is a base bias resistor, R5 is a collector load resistor, R6 is an emitter resistor, capacitor C7 is an emitter bypass capacitor. IC1 is a digital high frequency demodulation integrated circuit, and an Rx600, in which an SAW filter, an SAW delayer, an RF amplifier, a data limiter, a wave detector, a low pass filter and the like are provided, is used in this embodiment. Pins 17 and 18 of IC1 are connected in parallel and then connected to R/S state control. IC1 is on when R/S state is at a high level, and IC1 is in a standby state with low power consumption when R/S state is at a low level. R11, R12 and R13 are level clip resistors, R14 is a bandwidth control resistor, R10 and R15 are RF amplifying bias resistors, C12 and C13 are bypass capacitors, C14 is a coupling capacitor of pins 5 and 6, C10 and C11 are decoupling capacitors, resistors R7, R8 and R9 form a impedance matching circuit, capacitors C8, C9, C15 and inductor L9 form a filter circuit, L7 is a matching inductor, L8 is a protective inductor, and C8 functions as a coupling capacitor simultaneously. The circuit shown in FIG. 4B, which is a user demodulator, and the circuit shown in FIG. 4A are combined into high frequency digital modems T1-Tn at the front end. The high frequency composite signals Vjs from Fx or TS1-TSn are coupled to a frequency selection tuning circuit formed by L1 and C2 so that the signal needed by itself is selected, and the selected frequency can vary as the capacitance of C2 and inductance of L1 vary. The selected signal is coupled to the base of G1 via L2, converted to a designated frequency through a frequency conversion amplifying circuit formed by G1. The designated frequency can vary as capacitances of C3, C4, C5 and C6 or inductances of L3, L4 and L5 vary. The signal is then coupled to the base of G2 via L6, coupled by C8 and C9 and converted into have the impedance required by IC1 via R7, R8 and R9 after it is amplified by G2, input into pin 20 of the digital high frequency demodulation circuit IC1, processed by the internal circuit of IC2, and output as a digital baseband signal Uxs at pin 7. The signal Uxs is an uplink signal in user terminals Ux1-Uxn or W1-Wn at the front end.

FIG. 4C is a circuit schematic diagram of the digital high frequency modulator at the user terminal. In FIG. 4C, IC1 is a digital high frequency modulation integrated circuit, and a Tx6000, in which an SAW resonator, an SAW filter, an RF amplifier, a modulation circuit and a bias control circuit are provided, is used in this embodiment. L1 is a serial matching coil, L2 is a parallel protective coil, C12 and C13 are decoupling bypass capacitor, and R10 is a decoupling resistor. C1 is a coupling capacitor, and capacitor C2 and inductor L3 form a frequency selection tuning circuit. L4 is a coupling coil, G1 is a high frequency and frequency conversion amplifying transistor, R1 and R2 are base bias resistors of G1, C3 is a bypass capacitor, and R3 is an emitter resistor of G1. Capacitors C4, C5, C6 and C7, inductors L5, L6 and L7, high frequency magnetic cores H1 and H2 and G1 form a frequency conversion amplifying circuit all together, L8 is a coupling inductor, G2 is a high frequency amplifying transistor, R4 is a base bias resistor of G2, and R5 is an emitter resistor. C8 is a bypass capacitor, and R6 is a collector load resistor. Capacitors C9, C10, C11 and inductor L9 form a filter circuit, capacitor C9 functions as coupling capacitor simultaneously, resistors R7, R8 and R9 form an impedance matching circuit, and RF is a radio frequency output port. R10 is a dumping resistor. The digital baseband signal Us of a user terminal is input via pin 7 of IC1 and output as a high frequency composite signal from pin 20 after it is processed by the internal circuit, and coupled via L1 and C1 to the frequency selection circuit formed by C2 and L3. The selected frequency can vary as the capacitance of C2 or inductance of L3 varies. The signal is then coupled to the base of G1 via L4, converted to a designated frequency authorized by the user through the frequency conversion amplifying circuit formed by G1 and other peripheral elements. The designated frequency can vary as the capacitances of C4, C5, C6 and C7 or inductances of L5, L6 and L7 vary. The signal is then coupled to the base of G2 via L8, output by the collector via C9, C10, R7 and R8 to RF after it is amplified by G2, and connected to the high frequency coaxial cable so as to be input into the uplink cable.

Figure 5A:
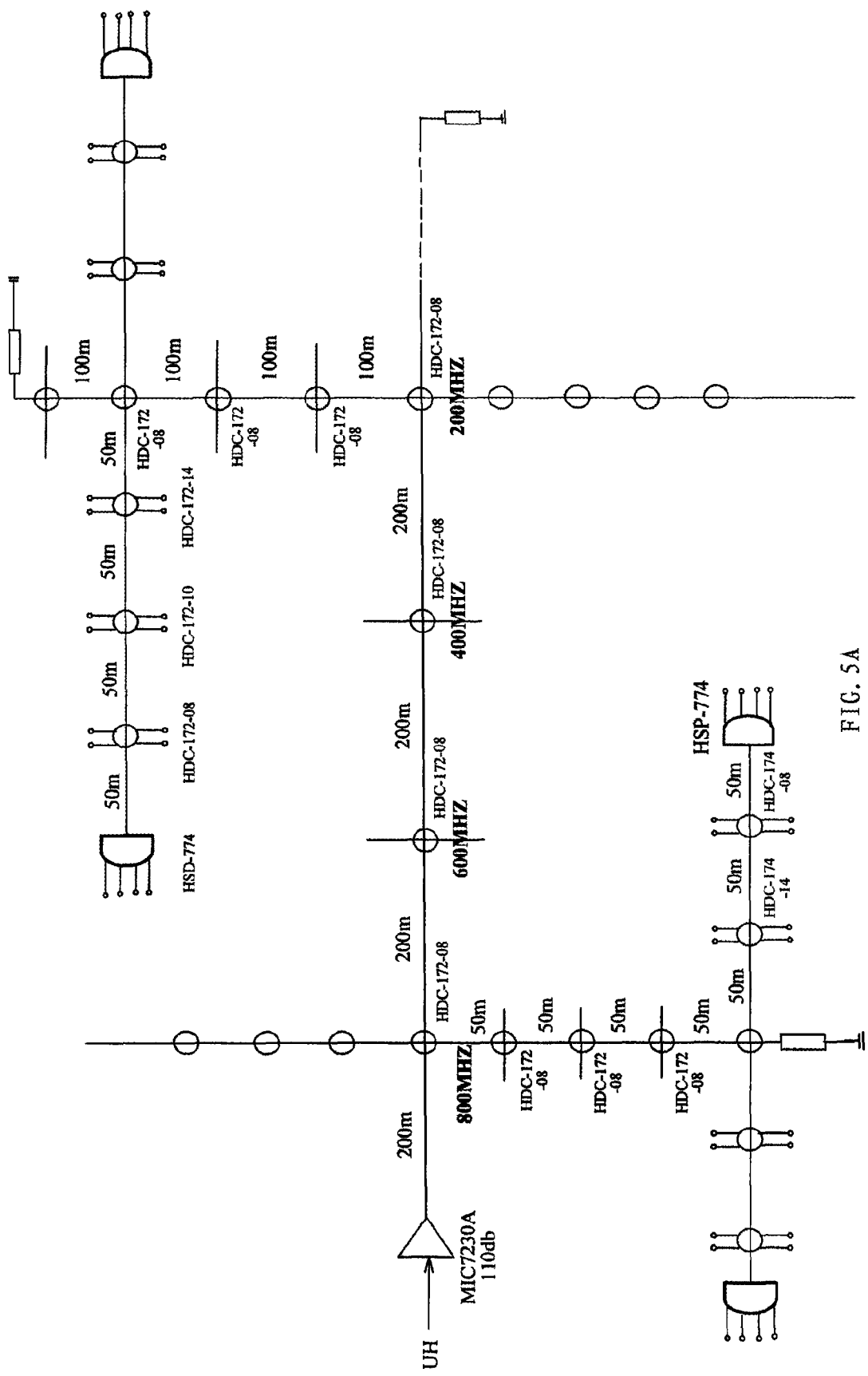
FIG. 5A is a schematic diagram of a uplink transmission network according to the present invention.
Figure 5B:
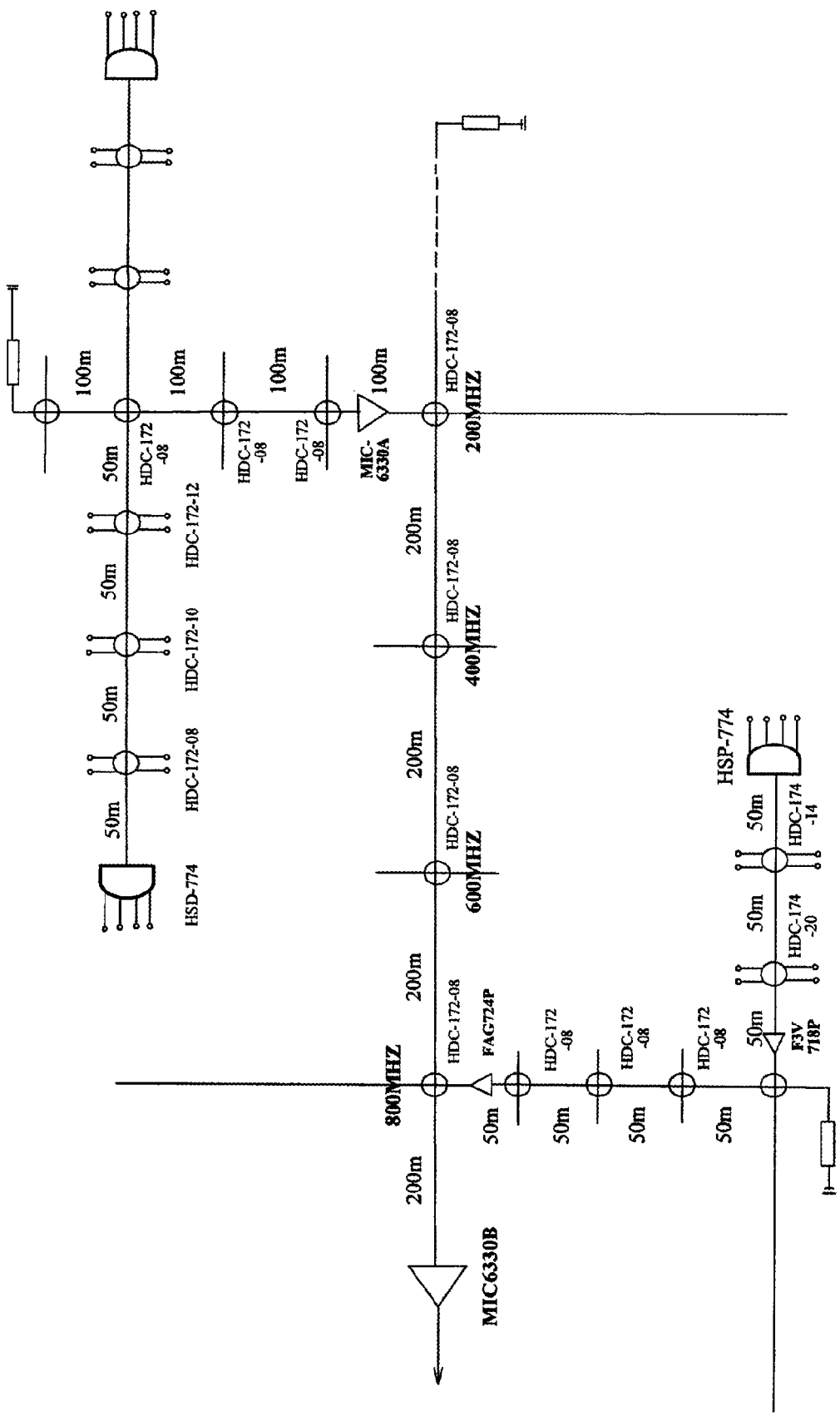
FIG. 5B is a schematic diagram of a downlink transmission network according to the present invention.

FIGS. 5A and 5B are circuit schematic diagrams of the downlink high frequency transmission network according to the present invention.

The network cables shown in FIGS. 5A and 5B adopt high frequency coaxial cables, for example Trilogync^2 0.500 coaxial cable of United States. For the technical standard and parameters used in the circuit, one can refer to the "Cable Television", by Meijun Cen and Chengfang Yu, FuDanPress and "Engineering Design and Maintenance of Broadcast Television Transmission Network", by Yong Li, Xinyu Da and Huamin Cao, Publishing House of Electronics Industry. Table 1 shows an analysis of the working performance of various series of high frequency coaxial cables at different frequency bands and transmission distances, to explain the design advantages of the transmission communication network according to the present invention.

mance of low frequency bands is sacrificed for a higher communication frequency. Thus, a large amount of equalization and slope control is used in the network for suppressing amplification of a low frequency band signal, which causes a huge resource waste. The designing principle of the present invention is to authorize each user a dedicated channel with a dedicated frequency, which can assign a working frequency depending on how far the distance is, seamless use transmission feature of high frequency coaxial cables at respective frequency bands, and omit equalization and slope control in the circuits. This can make the primary amplification transmit further than 1000 m (a relay amplification has to be made in less than 200 m to compensate for the high frequency loss in an 800 MHz network), and the field strength of low frequency band is maintained 84-98.5 db at 1000 m.

FIG. 5A is a schematic diagram of downlink transmission network according to the present invention. The CATV technical standard is used in design shown in the drawing. The UH is a downlink high frequency composite signal, which outputs, after being amplified by Mic 7230A, a field strength of 110 db (the highest 120 db output can be used in the trunk with no more than 3 levels amplification), is downward transmitted via a Triligymc^2 0.500 high frequency cable, and two

TABLE 1

Working performance of various series of the high frequency coaxial cables at different frequency bands and transmission distances.

| | | Frequency | | | | | |
|---|---|---|---|---|---|---|---|
| | | 800 MHZ | 600 MHZ | 400 MHZ | 200 MHZ | 30 MHZ | 5 MHZ |
| | SYKV-75-9 | 11.5 db | 9.0 db | 6.5 db | 5.2 db | 2.6 db | 1.4 db |
| | $MC^2$ 0.500 | 6.17 db | 5.32 db | 4.35 db | 3.04 db | 1.15 db | 1.0 db |
| Signal attenuation per 100 meters at each frequency band 110 db (output of the amplifier) Field Intensity of Each Frequency Band at Different Transmission Distance | | | | | | | |
| | 200 meters | | | | | | |
| | SYKV-75-9 | 87 db | 92 db | 97 db | 99.6 db | 104.8 db | 107.2 db |
| | $MC^2$ 0.500 | 97.60 db | 99.36 db | 101.3 db | 103.92 db | 107.7 db | 108 db |
| | 400 meters | | | | | | |
| | SYKV-75-9 | 64 db | 74 db | 84 db | 89.2 db | 99.6 db | 104.4 db |
| | $MC^2$ 0.500 | 85.32 db | 88.7 db | 92.6 db | 97.84 db | 105.4 db | 106 db |
| | 600 meters | | | | | | |
| | SYKV-75-9 | 41 db | 56 db | 71 db | 78.8 db | 94.4 db | 101.6 db |
| | $MC^2$ 0.500 | 72.9 db | 78.08 db | 82.9 db | 91.76 db | 103.1 db | 104 db |
| | 800 meters | | | | | | |
| | SYKV-75-9 | 18 db | 38 db | 58 db | 68.4 db | 89.7 db | 98.8 db |
| | $MC^2$ 0.500 | 60.64 db | 67.44 db | 75.2 db | 85.68 db | 100.8 db | 102 db |
| | 1000 meters | | | | | | |
| | SYKV-75-9 | −5 db | 20 db | 45 db | 58 db | 84 db | 96 db |
| | $MC^2$ 0.500 | 48.3 db | 56.8 db | 66.5 db | 79.6 db | 98.5 db | 100 db |

The above table indicates that the attenuation of signal is more significant as the working frequency becomes higher. In a traditional technical structure, the transmission performance branch-trunks are split out by a HDC-172-08 splitter at 200 m. All the users in the branch-trunk are authorized to use a frequency band higher than 800 MHz, such that the branch-trunk calculates only the field strength status of the signal at a frequency higher than 800 MHz at respective distances. A HDC-17-08 splitter is inserted every 50 m to split out two user branches, the output field strength of which is 110 db−6.17*2 (cable loss per hundred meters)−8(branch loss)=89.66 db. The respective users on the initial user branch use the highest frequency over 800 MHz. The fourth HDC-172-08 splitter is inserted at 200 m on the branch-trunk to split out two user branches, and its initial output of field strength is 89.66−6.17*2 (cable loss per hundred meters)−3*4 (insertion loss of three ½-splitters)−8 (branch loss)=57.32 db. The output of the first 4-branch user group, the second 4-branch user group, and the third 4-branch user group are 57.32−6.17*0.5−14=40.24 db, 57.32−6.17*1−4*1−8=39.15 db and 57.32−6.17*1.5−4*2−8(branch loss)=32.07 db, respectively. If the standard field strength at the user terminal according to the digital high frequency signal is 40 db±10 db, then the field strength of respective user terminals completely comply with the required standard. A branch-trunk amplifier may be added in a branch trunk for extending the distance. To secure the magnitude of signals, branch-trunk amplifiers can be added no more than 3 levels without adopting other technical solutions. In the trunk, a ½ splitter is inserted every 200 m to split out branch-trunks for respective frequency bands. Two branch-trunks, which are operated at a frequency higher than 200 MHz and lower than 300.9 MHz, are split out at 800 m, and the branch initial level is 10 db−3.04*8 (200 MHz cable loss)−1.5*3 (insertion loss of 3 splitters at 200 MHz)−8 (branch loss)=73.18 db. In a branch trunk, an HDC172-08 (or a 174−*) is inserted every 100 m to split out user branches, and the field strength level of the user wire split out at 300 m is 73.18−3.04*3−1.5*2−8=53.06 db. The output of the first 4-branch user group, the second 4-branch user group, the third 4-branch user group and the fourth 4-branch user group are 53.06−3.04*0.5−14=37.54 db, 53.06−3.04*1−1.5*1−10=38.52 db, 53.06−3.04*1.5−1.5*2−8=37.5 db, and 53.06−3.04*2−1.5*3−8=34.48 db, and the field strength levels of respective users comply with the required standard.

FIG. 5B is a schematic diagram of an uplink transmission network according to the present invention. The settings of the branch-trunks and the user branches are equal and correspond to those given in FIG. 5A, and the high frequency digital modulators of respective users are configured to an output of 110 db, such that the level from the furthest 4-branch user group of the user branch at 300 m of the 200 MHz frequency band branch to the trunk is 110−3.04*5 (500 m cable loss at 200 MHz)−1.5*6 (splitter insertion loss at 200 MHz)−8 (branch mixture loss)=77.8 db. The levels of respective user groups are as follows:

110−3.04*4.5−1.5*5−10=78.82 db;

110−3.04*4−1.5*4−14=77.84 db;

110−3.04*3.5−1.5*3−16=77.86 db.

They completely comply with the requirement for the input level of branch amplifiers. The above levels are amplified by a MIC-6330A and outputted as 10 db. The level reaching the front end trunk amplifier is 110−3.04*8−1.5*3=73.18 db. The level output to HF is 105.18 db after amplified by a trunk amplifier MIC 6330B. The level of the furthest 4-branch user group of the user branch-trunk at 200 m of the 800 MHz frequency band trunk on the trunk reaching the branch-trunk is 110−6.17*1.5−2*4−8=84.74 db, and the levels of other 4-branch user groups are 110−6.17*1−1*4−14=85.83 db, and 110−6.17*0.5−20=86.92 db, respectively. The highest level-1.5 db=85.42 db. When reaching the trunk after being amplified by a FBV718P, the level is 85.5±18−6.17*2−3*4−8=71.06 db, and when reaching the input port of the trunk amplifier after being amplified by a FAG-724P, the level is 71.06+24 (amplification gain)−6.17*2−8=74.72 db, the attenuation is adjusted so that the level differences with respect to other branch-trunks meet the requirements for the adjacent frequency technique (±2 db), and is outputted to the input port of HF after being amplified by a trunk amplifier MIC-6330A.

Figure 6:
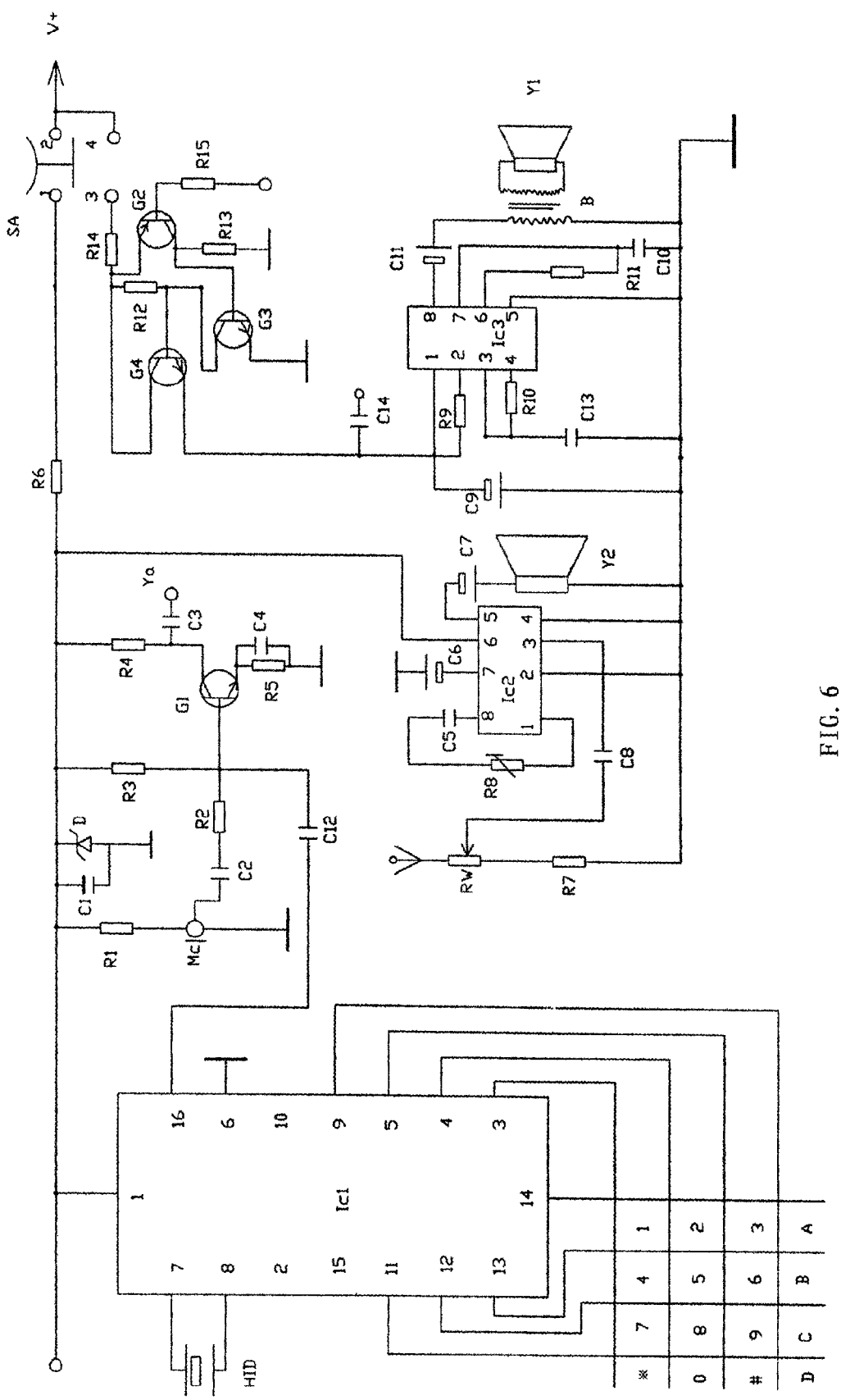
FIG. 6 is a schematic circuit diagram of a user terminal device according to an embodiment of the present invention.

FIG. 6 is a user terminal operation device of the present invention and for voice communication also. Here, IC1 is A MK5087 is used for IC1, which is a DTMF dial integrated circuit, and a keyboard logic circuit is provided therein. Pin 3, Pin 4, Pin 5, and Pin 9 are key column inputs. Pin 11, Pin 12, Pin 13 and Pin 14 are key row inputs. An external keyboard is connected. A clock oscillating circuit is provided. An oscillator HID connects to Pin 7 and Pin 8, Pin 7 is an oscillating input, and Pin 8 is an oscillating output. A frequency dividing circuit, a ladder scalar circuit, a D/A converting circuit etc. are built therein too. A DTMF signal is outputted from Pin 16. V+ is power. MC is a microphone. R1 is a bias resistor for MC. G1 is an audio amplifier triode. R3 is a base bias resistor. R4 is G1's collector load resistor. R5 is G1's emitter resistor. C4 is an emitter bypass capacitor. C2, C3, and C12 are coupling capacitors. R2 is a volume control resistor. Capacitor C1, voltage regulating diode D and resistor R6 form a power filtering circuit. G2, G3 and G4 are low frequency amplifier triodes. R15 is a base bias resistor of G2 for regulating the amplitude. R13 is G2's emitter resistor. R14 is a collector load resistor for G2, as well as a current regulating resistor for power protection. R12 is a collector load resistor for G3, as well as a base bias resistor for G4. An LM 386 is used as IC2, which is an audio amplification integrated circuit, wherein a pre-amplification circuit and a power amplification circuit are built therein. C6 is a bypass capacitor. C7, C8 and C14 are coupling capacitors. An adjustable resistor R8 and a capacitor C5, which are capable of changing the amplification gain, are disposed between Pin 1 and Pin 8. A potentiometer RW and a resistor R7 form a volume adjustment circuit. SA is a pressing spring switch, and V+ is power. When the input keyboard of IC1 is operated, a header and tail control signal, as well as a called side address for external and internal communication are sent out. It should be noted that D is a tail dedicated key and not used at the user terminal. The signal is outputted from Pin 16, coupled by C12 to the base of G1, amplified by G1 and outputted from the collector and C3, and inputted to Td1-Tdn after being A/D converted (PCM) to digital signals US1-USn. At this time, SA is in a picked-up state, and Pin 1 and Pin 2 of SA are connected. The keyboard operation circuit and the power amplification circuit composed of the audio amplification and IC2 are supplied with power. The voice of the called user is converted to an electric signal via MC, which reaches the base of G1 through C2 and R2, and then, after being amplified by G1, reaches the front end server via an uplink wire, so as to make a call with the called user after processing. The incoming call signal from the called user is processed and switched by the server, transmitted to the user via a downlink wire, inputted to the input port of RW after a D/A conversion, and coupled to Pin 3 of IC 2 via C8. A power audio signal is outputted from Pin 5 of IC 2 and is coupled by C7 to a speaker Y2, so that a voice is restored. When SA is in a hang-off status, Pin 1 and Pin 2 of SA are disconnected, while Pin 3 and Pin 4 are connected. When there is not a ring signal (determined by a communication signaling control), Ub is a low level, such that the base of the NPN triode G2 is at a low level. G2 is turned on, and a bias voltage is applied to the base of G3, which is turned on and starts working. As the voltage drop of R12 increases, the base of G4 is in an off state. When there is an incoming call ring signal, a high level is applied to the base of G2 and G2 is off. At this time, no base bias voltage is applied to G3 and G3 is off, such that the voltage drop of R12 decreases, increasing the base bias level of G4 which is then turned on and works. IC3 is supplied power through the collector and emitter of G4. IC3 is a ring integrated circuit KA2410, and two groups of high and low oscillation circuits are built therein. Resistor R10 which connects to pin 3 and capacitor C13 which connects to Pin 3 form a low frequency oscillation. Resistor R11 and capacitor C10 that respectively connect to Pin 6 and Pin 7 form a high frequency oscillation. Resistor R9 connects to Pin 2 to be a power trigger control. Power is supplied to Pin 1. C9 is a filtering capacitor, the oscillating frequency of which depends on R10, C13, R11 and C10. When the power is on, a high and a low group oscillating frequency signals generated by IC3 alternates at a frequency of 10Hz, outputted from Pin 8 after being amplified, coupled to the primary coil of an audio adapter B by C11, then coupled the secondary coil, and finally outputted from speaker Y1 to complete the ring alert operation. If the ring signal is terminated, G4 is turned off, and IC3 is powered off and terminates operation. If the user picks up the phone, Pin 1 and Pin 2 of SA are connected, and Pin 3 and Pin 4 are disconnected to terminate the ring.

Figure 7:
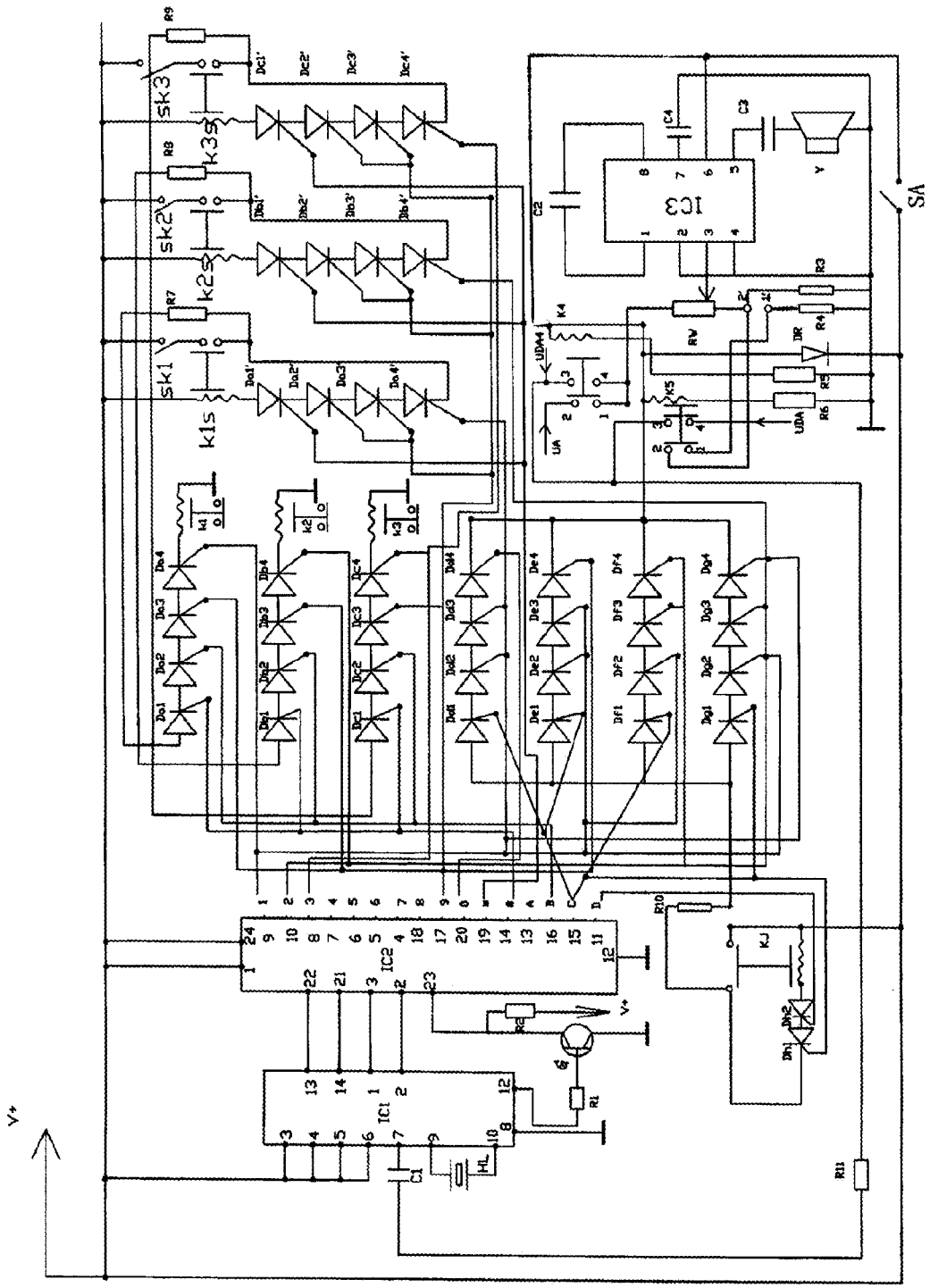
FIG. 7 is a schematic circuit diagram of a user terminal remote controlling device according to an embodiment of the present invention.

FIG. 7 is a schematic diagram of the multi-functional service interface circuit in a user terminal according to the present invention. As shown, IC1 is a DTMF decoding application specific integrated circuit, for which an YN9101 is used in this embodiment, and has the same internal circuit as the IC1 of FIG. 2A. HL is a crystal oscillator connecting to Pin 9 and Pin 10. Pin 7 is an input pin for a dual tone signal. G is a low frequency amplifying triode. R1 is a base bias resistor for G and R2 is a collector load resistor for G.

IC2 is a DTMF transcoding application specific integrated circuit, for which a CD4028 is used in the preset embodiment, and its internal circuit configuration is the same as that of IC2 in FIG. 2A. When a DTMF code signal arrives, the signal is coupled by C1 and inputted to Pin 7 of IC1. Two groups of binary DTMF signals are outputted from Pin 1, Pin 2, Pin 13, and Pin 14 to the corresponding Pin 3, Pin 2, Pin 22, and Pin 21 of IC 2. At this time, the high level is outputted from Pin 12 of IC1 to the base of G, such that a base bias voltage is applied to G and G is turned on. Pin 23 of IC2 is grounded to ensure IC1 and IC2 are in an operating state only if there is a DTMF signal. The binary DTMF signal is transcoded by IC2 to decimal dual-audio signals of 1, 2, 3, 4, 5, 6, 7, 8, 9, 0, *, A, B, C, D, which are outputted from Pins 9, 10, 8, 7, 6, 5, 4, 18, 17, 20, 19, 14, 13, 16, 15, 11, respectively. Kj is a normal-closed relay, and Da1, Da2, Da3, Da4, Da1', Da2', Da3', Da4', Db1, Db2, Db3, Db4, Db1', Db2', Db3', Db4', Dc1, Dc2, Dc3, Dc4, Dc1', Dc2', Dc3', Dc4', Dd1, Dd2, Dd3, Dd4, De1, De2, De3, De4, Df1, Df2, Df3, Df4, Dg1, Dg2, Dg3, Dg4, Dh1 and Dh2 are unidirectional crystal shutters. IC3 is an audio power amplification integrated circuit, for which an LM 386 is used in this embodiment, and has a pre-amplification circuit and power amplification circuit therein. A potentiometer RW and resistor R4 form a volume adjusting circuit. R3 is a volume maintaining resistor for auto-alerting, which has a resistance much greater than R4. Resistors R5, R6, R7, R8, R9 and R10 are current limiting protection resistors. R1 is a damping resistor. C1, C2, C3, and C5 are coupling capacitors. C4 is a bypass capacitor. The control electrodes of Da1, Da2, Da3, and Da4 are respectively connected to Pin # (14), Pin B (16), Pin 9 (17) and Pin 1 (9) to form a control circuit of code #B91, which is connected in serial to a normal-open relay K1. The control electrodes of corresponding Da1', Da2', Da3', and Da4' are connected to Pin □(19), Pin 9 (17), Pin 9 (17) and Pin 1 (9) respectively to form a control circuit for code □991, which is connected in serial to a normal-closed relay and a manual switch SK1. When SK1 is open, the control does not work. Likewise, the control electrodes of Db1, Db2, Db3, Db4, and Dc1, Dc2, Dc3, Dc4 are connected to the corresponding pins of IC2, and connected in serial to normal-open relays K2 and K3 respectively to form a #B92 and a #B93 control circuit. The control electrodes of the corresponding Db'1, Db'2, Db3', Db4' and Dc1', Dc2', Dc3', Dc4', as well as their corresponding pins of IC2 form code □992 and □993 control circuits of normal-closed relays K2S, K3S and manual switches SK2, SK3. K1, K2 and K3 are connected in serial to the power switches of indoor and outdoor appliances that need to be controlled, such as the air conditioner, washer, and lights etc. If more control is needed, multiple code control circuits can be configured in this way. The control electrodes of Dd1, Dd2, Dd3, and Dd4 are connected to Pin C (15), Pin 1 (9), Pin 1 (9), and Pin 0 (20) of IC2, respectively. The control electrodes of De1, De2, De3, and De4 are connected to Pin C (15), Pin 1 (19), Pin 1 (19), and Pin 9 (12) of IC2, respectively. The control electrodes of Dg1, Dg2, Dg3, and Dg4 are connected to Pin C (15), Pin 1 (19), Pin 2 (10), and Pin 1 (9) of IC2, respectively. As such, code control circuits of C110, C119, and C121 are formed respectively, and a normal-closed relay K5 and a combined relay K4 are connected in serial to their ports. When K4 does not work, its Pin 1 and Pin 2 are connected. An audio signal is inputted to the input port of RW, and then inputted to Pin 3 of IC3 via the adjustment port. An amplified audio power signal amplified and outputted from Pin 6 is coupled by C3 to drive speaker Y. When K5 does not work, its Pin 1 and Pin 2 are connected, such that a resistor R4 is connected to one port of RW to form a volume adjusting circuit. Since the resistance of R3 is much greater than R4, R3 does not work. Pin 6 of IC3 connects to power V+. SA is a manual switch of the audio amplification circuit. DR is a diode. The controlling electrodes of Dh1 and Dh2 are connected to Pin C and Pin D of IC2 respectively to form code C and code D, which is connected to a normal-closed relay switch Kj in serial. One port of the control coil of Kj is connected to the upper ports of C110, C119, and C121. It is operated in this manner: when a user uses a cell phone or telephone remotely (at this time, Sk1, Sk2 and Sk3 are in a closed state, and when Sk1, Sk2 and Sk3 are open, their corresponding control does not work), to first dial a user's home telephone number, and a signal is connected through a server in the telecom and user network. After receiving the signal, the server processes and transmits it to the client. The signal is subjected to a D/A converter, applied to Pin 4 of K5, outputted to a coupling capacitor C1 via R11 from Pin 3 of K5, and then inputted to Pin 7 of IC1. When hearing a ring back tone, the user can remotely press #B91 keys of the cell phone or the telephone (it is proposed that keys A, B, C, and D of the cell phone or telephone are enabled so as to facilitate operating; a cell phone or telephone without this key function can start with other numbers). At this time, Da1, Da2, Da3 and Da4 are turned on, and a closed circuit is formed with power through the normal-closed relay Sk1, to Da1, Da2, Da3, Da4 and K1, R7. The control coil of K1 is powered, such that K1 is closed to complete the remote power-on control in home. Likewise, #B92 and #B93 can be operated to control the other related appliances to power on to operate. When the user dials the home telephone number remotely with a cell phone or telephone, key □991 may be operated, such that Da1', Da2', Da3' and Da4' are turned on. A relay K1S is powered to open the normal-closed relay, such that Da1, Da2, Da3, Da4, Da1', Da2', Da3' and Da4' are off instantly to release power, to be in an off standby state. K1 is open, and K1s is closed to return to a standby state, such that a remote power-off function is completed. Likewise, □992 and □993 can be operated to complete corresponding power-off control.

When alarm and command information is needed to be passed to users by levels, regions and users in the cases of public emergency events, such as group commanding of critical criminal cases, traffic control during accidents, various sudden meteorological disasters, fire alarms among users etc. The manager can transmit C110 or C119 to a user area or user group in need of service, and transmits C122 and C121 to the user via a user area server to deliver a communication alarm commanding service signal UDA4. Db1-Db4, De1-De4, Df1-Df4, and Dg1-Dg4 are turned on, supplying power to K4 and K5 through a normal-closed relay Kj to enable them to operate. K4 disconnects Pin 1 and Pin 2 to cut off the pre-stage signal, and connects Pin 3 and Pin 4 to supply power to IC3. DR is used to prevent power from being supplied to the circuit when it is in normal operation. At this time, SA does not function, and K5 disconnects Pin 1 and Pin 2 to float R4. Since the resistance of R3 is much greater than R4, RW is in a maximum volume state to ensure the alarming effect. At this time, the alarm signal or voice command signal UDA that comes from the front is inputted to Pin 3 of IC3 through RW, such that the public emergency alarm commanding function is completed. This function can applied to the audio amplification circuits of home appliances such as TVs, stereo systems, computers etc. When the alarm ends, a trigger in which code C and code D are added to the tail turns on Dn1 and Dn2. Kj is powered and the normal-closed relay is open, such that the related De1-De4, Df1-Df4, Dg1-Dg4, Dh1, and Dh2 are turned off in a standby state. Consequently, the intelligent emergency public service functions such as auto power-on, auto volume-up, auto power-off on the client side, can be achieved when a public emergent event occurs.

According to the system of frequency-allocation user access LAN and the uplink-downlink transmission method, a new resource configuration technique for providing each user with a dedicated communication channel that is not affected by a busy or a idle status, and a physical layout configuration of a high frequency, broad spectrum, high speed and capacity for a passive user access LAN that can operate without relay amplification in its main trunk, are provided to achieve seamless communication resource utilization and construct an operation and communication service technology that is suitable for the working habits of the mass public, easy to learn and use, and can be easily propagated. It is possible to efficiently support data communication access of the backbone networks such as broadcasting, telecommunication, the Internet, public information service networks and so on in one network, and multi-functional communication within a local network. The advantage of digital information technique can be better utilized in the aspects of its intelligence (high speed logic operations), transmission (communication with a high speed and large capacity), and storage (mass information access in a high speed and capacity). Functions and tasks of the backbone network and user access LANs are separated to achieve a highly efficient data communication pattern and to be compatible with the existing TCP/IP technical structure and the analog communication system. The system has advantage as follows: low overall cost; easy to construct and maintain; easy to manage; no need for wiring construction when increasing user capacity; little wiring; adaptability to technology upgrades; industrial mass production of apparatuses for user access LANs; transformation of broadcast and telecom system with low costs. The present invention is suitable for the social situation of high user density and huge information communication. Since it efficiently supports popular application, it is advantageous for the fast development of digitalized society.

While this invention has been particularly shown and described with reference to exemplary embodiments thereof, the above exemplary embodiments are not restrictive but illustrative in all aspects. It will be understood by those skilled in the art that various changes in form and details may be made therein without departing from the spirit and scope of the invention as defined by the appended claims.

What is claimed is:

1. A system of frequency allocation for a user access Local Area Network, comprising:
an information processing apparatus configured to:
process an input of a backbone network; and
generate a downlink integrated digital baseband signal with a plurality of user address codes;
a switch configured to:
receives the downlink integrated digital baseband signal generated by the information processing apparatus; and
generate multiple downlink multiple digital baseband signals with a plurality of user address codes;
a plurality of first modulators, each of which configured to:
function at a different frequency;
receive a corresponding one of the multiple downlink multiple digital baseband signals generated by the switch, according to a header contained in one of the plurality of user address codes;
modulate the received downlink multiple digital baseband signal; and
generate one downlink high frequency composite signal with a corresponding frequency;
a broadband high frequency synthesizer configured to:
synthesize the plurality of downlink high frequency composite signals generated by the plurality of first modulators; and
generate one first downlink high frequency broadband composite signal;
a downlink amplifier configured to:
amplify the first downlink high frequency broadband composite signal received from the broadband high frequency synthesizer to a design level; and
generate an amplified first downlink high frequency broadband composite signal;
a plurality of trunk splitters configured to:
perform grading according to the frequency band of a main network segment and perform cascading;
receive the amplified first downlink high frequency broadband composite signal from the downlink amplifier according to the main network segment; and
split the amplified first downlink high frequency broadband composite signal into second downlink high frequency broadband composite signals of a plurality of main network segments by the frequency, each comprising a plurality of sub-network segments, the plurality of main network segments corresponding to different frequency bands, the plurality of sub-network segments corresponding to different frequency bands;
a plurality of branch splitters which correspond to respective trunk splitter groups, each group of branch splitters of each trunk splitter configured to perform grading according to the frequency band of the plurality of sub-network segments within the range of main network segment and perform cascading, each of the plurality of branch splitters configured to:
  receive one of the second downlink high frequency broadband composite signals of the one sub-network segment in correspondence with the one sub-network segment among the plurality of sub-network segments; and
  generate multiple third downlink high frequency broadband composite signals of the one sub-network segment;
a plurality of user terminal digital high frequency demodulators, each configured to:
  receive the multiple third downlink high frequency broadband composite signals in the corresponding subnetwork segment from the corresponding one among the plurality of branch splitters;
  select one of the multiple third downlink high frequency broadband composite signals in the sub-network segment with the frequency corresponding to the user address code according to the user address code; and
  demodulate the selected one of the multiple third downlink high frequency broadband composite signals to a downlink digital baseband signal corresponding to the frequency;
a plurality of user terminal modulators, each configured to:
  receive a corresponding one of the plurality of digital baseband signals with the header of an address code according to a user instruction, and
  modulate the received corresponding one of the plurality of digital baseband signals to an uplink high frequency composite signal corresponding to one of the sub-network segment frequencies of the plurality of user terminal modulators;
a plurality of branch mixers which correspond to the group of the main network segments, configured to:
  perform grading according to the frequency band of the plurality of sub-network segments within the main network segment and perform cascading;
  mix the plurality of uplink high frequency composite signals received from the corresponding user terminal modulator among the plurality of user terminal modulators and the uplink high frequency composite signal received from an adjacent lower branch mixer in the group grade by grade from low frequency to high frequency; and
  generate a first uplink high frequency broadband composite signal corresponding to each lower sub-network segment covering the lower corresponding frequency;
a plurality of trunk mixers configured to:
  perform grading according to the frequency band of the main network segment and perform cascading;
  mix the first uplink high frequency broadband composite signal received from an adjacent branch mixer in the branch mixer group corresponding to the main network segment and the uplink high frequency broadband composite signal from the trunk mixer of an adjacent main network segment with a lower frequency band; and
  generate a second uplink high frequency broadband composite signal corresponding to each lower main network segment covering the lower corresponding frequency;
an uplink amplifier configured to:
  amplify the second uplink high frequency broadband composite signal received from the adjacent trunk mixer; and
  generate an amplified uplink integrated high frequency broadband composite signal;
a broadband high frequency allocator configured to:
  receive the amplified uplink integrated high frequency broadband composite signal, and
  allocate the amplified uplink integrated high frequency broadband composite signal to multiple uplink high frequency broadband composite signals; and
a plurality of first demodulators configured to:
  receive one of the multiple uplink high frequency broadband composite signals that corresponds to a user terminal frequency,
  perform demodulation to generate one digital demodulated baseband signal with a user address code, and
  provide the digital demodulated baseband signal to the information processing apparatus via the switch,
wherein the information processing apparatus is further configured to:
  select the output of the backbone network according to the header of the address code in the received digital demodulated baseband signal, or
  provide a downlink integrated digital baseband signal with a plurality of headers of the user dual tone multi-Frequency (DTMF) address code to the switch.

2. The system of frequency allocation for a user access Local Area Network of claim 1, wherein the address code comprises a DTMF address code, comprising a header and a tail.

3. The system of frequency allocation for a user access Local Area Network of claim 2, wherein each of the plurality of first modulators comprises:
  a digital-analog converting circuit configured to:
    receive one corresponding downlink multiple baseband signal with a plurality of user address codes from the switch; and
    convert the received one corresponding downlink multiple baseband signal to an analog baseband signal;
  a DTMF decoding circuit configured to:
    receive the analog baseband signal from the digital-analog converting circuit;
    decode the analog baseband signal according to the header of the DTMF address code; and
    output two groups of binary DTMF code signals;
  a DTMF transcoding circuit configured to:
    receive the two groups of binary DTMF code signals; and
    decode the received the two groups of binary DTMF code signals to decimal DTMF code signals;
  a DTMF code switch circuit configured to:
    receive the decimal DTMF code signals;
    output a power controlling current when the header is included in the decimal DTMF code signal; and
    not output the power controlling current when the tail is included in the decimal DTMF code signal;
  a digital high frequency modulating part configured to:
    receive one corresponding downlink multiple digital baseband signal with a plurality of user address codes from the switch;
    modulate the one downlink multiple digital baseband signal; and
    output a downlink high frequency composite signal with a fixed frequency when the power controlling current is received; and
  a frequency converting part configured to:
    receive the downlink high frequency composite signal with the fixed frequency from the digital high frequency modulating part; and convert the received downlink high frequency composite signal with the fixed frequency to a downlink high frequency composite signal with a frequency corresponding to the user address code.

4. The system of frequency allocation for a user access Local Area Network of claim 3, wherein the DTMF code switch circuit comprises:
  a power-on address code combining circuit part configured to:
    receive the header of the decimal DTMF code signal; and
    generate a power controlling current; and
  a power-off code circuit part configured to:
    receives the tail of the decimal DTMF code signal;
    generate a power-off signal; and
    control the power-on address code combining circuit part to be powered off.

5. The system of frequency allocation for a user access Local Area Network of claim 1, wherein each of the trunk splitters and each of the branch splitters comprise 2×n splitters, where n is a positive integer greater than 1.

6. The system of frequency allocation for a user access Local Area Network of claim 1, wherein each of the trunk mixers and each of the branch mixers comprise 2×n mixers, where n is a positive integer greater than 1.

7. The system of frequency allocation for a user access Local Area Network of claim 1, wherein:
  the first modulator comprises a digital high frequency modulator; and
  the first demodulator comprises a digital high frequency demodulator.

8. The system of frequency allocation for a user access Local Area Network of claim 1, further comprising a band pass filter disposed between each of the plurality of trunk splitters and the adjacent branch splitter the band pass filter configured to restrict the frequencies other than the frequency corresponding to the frequency in the plurality of sub-network segments.

9. A downlink transmission method in a frequency allocated user access Local Area Network, the method comprising:
  processing an input of a backbone network;
  generating a downlink integrated digital baseband signal with a plurality of user address codes;
  receiving the generated downlink integrated digital baseband signal;
  generating multiple downlink multiple digital baseband signals with the plurality of user address codes;
  receiving a corresponding one of the generated multiple downlink multiple digital baseband signals, according to a header contained in one of the plurality of user address codes;
  modulating the received downlink multiple digital baseband signals;
  generating one downlink high frequency composite signal with a corresponding frequency;
  synthesizing the generated plurality of downlink high frequency composite signals;
  generating one first downlink high frequency broadband composite signal;
  amplifying the first downlink high frequency broadband composite signal to a design level;
  generating the amplified first downlink high frequency broadband composite signal;
  receiving the amplified first downlink high frequency broadband composite signal, according to a main network segment;
  splitting the amplified first downlink high frequency broadband composite signal into second downlink high frequency broadband composite signals of a plurality of main network segments by the frequency, each comprising a plurality of sub-network segments, the plurality of main network segments corresponding to different frequency bands, the plurality of sub-network segments corresponding to different frequency bands;
  receiving one of the second downlink high frequency broadband composite signals of the one sub-network segment in correspondence with the one sub-network segment among the plurality of sub-network segments;
  generating multiple third downlink high frequency broadband composite signals of the one sub-network segment;
  receiving the multiple third downlink high frequency broadband composite signals in the corresponding sub-network segment;
  selecting one of the multiple third downlink high frequency broadband composite signals in the sub-network segment with the frequency corresponding to the one of the plurality of user address codes according to the one of the plurality of user address codes;
  demodulating the selected one of the multiple third downlink high frequency broadband composite signals to a downlink digital baseband signal corresponding to the frequency.

10. The downlink transmission method in a frequency allocated user access Local Area Network of claim 9, wherein the address code comprises a dual tone multi-Frequency (DTMF) address code, comprising a header and a tail.

11. The downlink transmission method in frequency allocated user access Local Area Network of claim 10, wherein the receiving a corresponding one of the generated multiple downlink multiple digital baseband signals, modulating the received downlink multiple digital baseband signals, and generating one downlink high frequency composite signal with a corresponding frequency comprises:
  receiving the one corresponding downlink multiple baseband signal with the plurality of user address codes;
  converting the received one corresponding downlink multiple baseband signal to an analog baseband signal;
  receiving the analog baseband signal;
  decoding the analog baseband signal according to the header of the DTMF address code;
  outputting two groups of binary DTMF code signals;
  decoding the two groups of binary DTMF code signals to decimal DTMF code signals;
  receiving the decimal DTMF code signals;
  outputting a power controlling current when the header is included in the decimal DTMF code signal;
  not outputting the power controlling current when the tail is included in the decimal DTMF code signal;
  receiving a corresponding downlink multiple digital baseband signal with a plurality of user address codes;
  modulating the corresponding downlink multiple digital baseband signal;
  outputting a downlink high frequency composite signal with a fixed frequency when the power controlling current is received;
  converting the downlink high frequency composite signal with the fixed frequency to a downlink high frequency composite signal with a frequency corresponding to the one of the plurality of user address codes; and
  outputting the downlink high frequency composite signal with a frequency corresponding to the user address code.

12. The downlink transmission method in a frequency allocated user access Local Area Network of claim 9, wherein in splitting the amplified first downlink high frequency broadband composite signal, 2×n splitters are used to split the amplified first downlink high frequency broadband composite signal, where n is a positive integer greater than 1.

13. The downlink transmission method in a frequency allocated user access Local Area Network of claim 9, wherein digital high frequency modulation is used for modulation.

14. An uplink transmission method in a frequency allocated user access Local Area Network, the method comprising:
   receiving a plurality of user instructions from a plurality of user terminal modulators;
   receiving a digital baseband signal corresponding to each user instruction in a plurality of digital baseband signals with headers of address codes according to the plurality of user instructions; and
   modulating the digital baseband signal corresponding to each user instruction to a plurality of uplink high frequency composite signals corresponding to one of the sub-network segment frequencies of the plurality of user terminal modulators, the plurality of sub-network segments forming a plurality of main network segments, the plurality of main network segments corresponding to different frequency bands, the plurality of sub-network segments corresponding to different frequency bands, the frequency band of the main network segment covering the frequency band of the sub-network segment contained therein;
   mixing the plurality of uplink high frequency composite signals received from the corresponding user terminal modulator among the plurality of user terminal modulators and the uplink high frequency composite signal received from an adjacent lower branch mixer in the group, grade by grad; from low frequency to high frequency; and
   generating a first uplink high frequency broadband composite signal corresponding to each lower sub-network segment covering the lower corresponding frequency, by using a plurality of branch mixers which correspond to the group of the main network segments;
   performing grading according to the frequency band of the plurality of sub-network segments within the main network segment and performs cascading;
   mixing the first uplink high frequency broadband composite signal received from an adjacent branch mixer in the branch mixer group corresponding to the main network segment and the uplink high frequency broadband composite signal from the trunk mixer of an adjacent main network segment with a lower frequency band;
   generating a second uplink high frequency broadband composite signal corresponding to each lower main network segment covering the lower corresponding frequency, by using a plurality of trunk mixers which perform grading according to the frequency band of the main network segment and perform cascading;
   amplifying the second uplink high frequency broadband composite signal received from the trunk mixer with the highest network segment frequency among the plurality of trunk mixers;
   generating an amplified uplink integrated high frequency broadband composite signal;
   allocating the amplified uplink integrated high frequency broadband composite signal to multiple uplink high frequency broadband composite signals;
   receiving one of the multiple uplink high frequency broadband composite signals corresponding to the user terminal frequency respectively by using each of the plurality of demodulators;
   performing demodulation to generate multiple digital demodulated baseband signals with user address codes;
   receiving the generated multiple digital demodulated baseband signal; and
   outputting an integrated digital baseband signal with a plurality of headers of user dual tone multi-Frequency (DTMF) address codes, according to the header of the address code in the received multiple digital demodulated baseband signals.

15. The uplink transmission method in a frequency allocated user access Local Area Network of claim 14, wherein each of the trunk mixers and each of the branch mixers comprise 2×n mixers, where n is a positive integer greater than 1.

16. The uplink transmission method in a frequency allocated user access Local Area Network of claim 14, wherein the demodulator comprises a digital high frequency demodulator.

* * * * *